(12) United States Patent
Benthin et al.

(10) Patent No.: US 10,839,475 B2
(45) Date of Patent: Nov. 17, 2020

(54) APPARATUS AND METHOD FOR COMPRESSING LEAF NODES OF A BOUNDING VOLUME HIERARCHY (BVH)

(71) Applicant: Intel IP Corporation, Santa Clara, CA (US)

(72) Inventors: Carsten Benthin, Voelklingen (DE); Sven Woop, Völklingen (DE); Ingo Wald, Salt Lake City, UT (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/236,185

(22) Filed: Dec. 28, 2018

(65) Prior Publication Data

US 2019/0318445 A1    Oct. 17, 2019

Related U.S. Application Data

(60) Provisional application No. 62/656,349, filed on Apr. 11, 2018.

(51) Int. Cl.
| | |
|---|---|
| *G06T 15/00* | (2011.01) |
| *G06T 1/20* | (2006.01) |
| *G06F 9/38* | (2018.01) |
| *G06T 17/10* | (2006.01) |
| *G06T 15/06* | (2011.01) |

(52) U.S. Cl.
CPC ............. *G06T 1/20* (2013.01); *G06F 9/3877* (2013.01); *G06T 15/005* (2013.01); *G06T 15/06* (2013.01); *G06T 17/10* (2013.01); *G06T 2210/12* (2013.01)

(58) Field of Classification Search
CPC ... G06T 15/06; G06T 2210/12; G06T 17/005; G06T 15/80; G06T 15/08; G06T 17/10; G06T 2210/08; G06T 9/00; G06F 16/9027; G06F 2212/401
See application file for complete search history.

(56) References Cited

U.S. PATENT DOCUMENTS

| | | | |
|---|---|---|---|
| 2011/0080403 A1* | 4/2011 | Ernst | G06T 15/06 345/420 |
| 2018/0373809 A1* | 12/2018 | Ylitie | G06T 15/06 |

OTHER PUBLICATIONS

Attila T. Áfra et al., "Local Shading Coherence Extraction for SIMD-Efficient Path Tracing on CPUs", High Performance Graphics, The Eurographics Association, 2016, pp. 119-128.

(Continued)

*Primary Examiner* — Hau H Nguyen
(74) *Attorney, Agent, or Firm* — Nicholson De Vos Webster & Elliott LLP

(57) ABSTRACT

Apparatus and method for compressing an acceleration data structure such as a bounding volume hierarchy (BVH). For example, one embodiment of a graphics processing apparatus comprises: one or more cores to execute graphics instructions including instructions to perform ray tracing operations; and compression circuitry to compress lowest level nodes of a hierarchical acceleration data structure comprising a plurality of hierarchically arranged nodes, each of the lowest level nodes comprising pointers to leaf data; the compression circuitry to quantize the lowest level nodes to generate quantized lowest level nodes and to store each quantized lowest level node and associated leaf data without the pointers to the leaf data.

30 Claims, 34 Drawing Sheets

(56) References Cited

OTHER PUBLICATIONS

Benjamin Segovia et al., "Memory Efficient Ray Tracing with Hierarchical Mesh Quantization", GI '10: Proceedings of Graphics Interface, May 2010, 8 pages.

Christian Lauterbach et al., "ReduceM: Interactive and Memory Efficient Ray Tracing of Large Models", Eurographics Symposium on Rendering 2008, vol. 27, No. 4, 2008, 9 pages.

H. Dammertz et al., "Shallow Bounding Volume Hierarchies for Fast SIMD Ray Tracing of Incoherent Rays", EGSR '08, 2008, pp. 1-8.

Henry Ylitie et al., "Efficient Incoherent Ray Traversal on GPUs Through Compressed Wide BVHs", High-Performance Graphics '17, Jul. 28-30, 2017, 13 pages.

Ingo Wald et al., "Embree: A Kernel Framework for Efficient CPU Ray Tracing", ACM Transactions on Graphics, vol. 33, No. 4, Article 143, Jul. 2014, pp. 143:1-143:8.

Ingo Wald et al., "Getting Rid of Packets: Efficient SIMD Single-Ray Traversal using Multi-branching BVHs", IEEE/EG Symposium on Interactive Ray Tracing, Aug. 9-10, 2008, pp. 49-57.

Jeffrey A. Mahovsky et al., "Memory-Conserving Bounding Volume Hierarchies with Coherent Ray Tracing", IEEE Transactions on Visualization and Computer Graphics, 2006, pp. 1-8.

Manfred Ernst et al., "Multi Bounding Volume Hierarchies", IEEE/EG Symposium on Interactive Ray Tracing, Aug. 9-10, 2008, pp. 35-40.

S. Keely, "Reduced Precision for Hardware Ray Tracing in GPUs", High Performance Graphics, The Eurographics Association, 2014, pp. 29-40.

Steven G. Parker et al., "OptiX: A General Purpose Ray Tracing Engine", ACM Transactions on Graphics, vol. 29, No. 4, Article 66, Jul. 2010, pp. 66:1-66:13.

Vlastimil Havran, "Heuristic Ray Shooting Algorithms (Dissertation Thesis)", Faculty of Electrical Engineering, Czech Technical University, Prague, Nov. 2000, 220 pages.

* cited by examiner

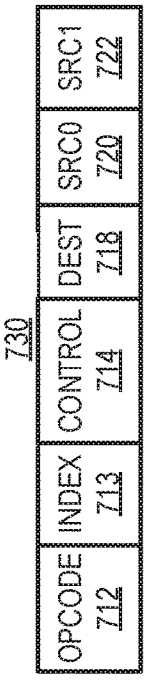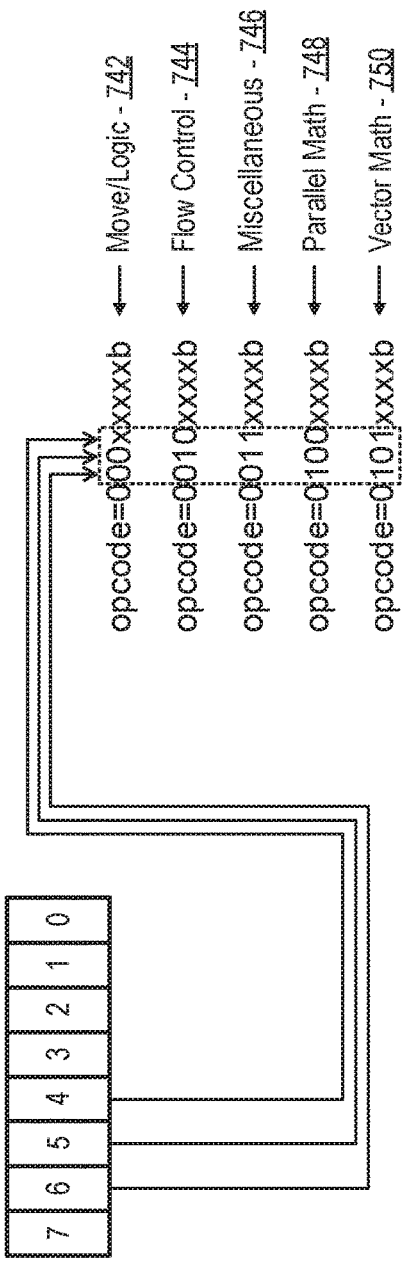
FIG. 7

Composite Floating Point Data Block 1900

| Sign (1-bit) 1902 | Exp (E-bit signed int) 1904 | Mantissa (K-bit unsigned int) 1906 |

Quantized BVH Node 1910

| Parent_lower_x 1912 | Parent_lower_y 1914 | Parent_lower_z 1916 | Higher Precision (e.g., CFP) |
|---|---|---|---|
| Exp_x 1922 | Child_lower_x 1924 | Child_upper_x 1926 | Lower Precision (e.g., fixed point) |
| Exp_y 1932 | Child_lower_y 1934 | Child_upper_y 1936 | |
| Exp_z 1942 | Child_lower_z 1944 | Child_upper_z 1946 | |
| Child Reference 1952 | | | |

FIG. 19

```
// regular BVH8 node: 192+64=256 bytes
struct BVH8Node {
    // one float box per child
    box3f childBounds[8];
    // child pointers (to nodes _or_ prims)
    uint64 childRef[8]; };

// quantized QBVH8 node: 24+48+64=136 bytes
struct QBVH8Node {
    // shared de-quantization scale and offset
    vec3f scale, offset;
    // 8 child boxes, in 8-bit fixed-point
    box3ui8 childBounds[8];
    // child pointers (to nodes _or_ prims)
    uint64  childRef[8]; };

// our leaf nodes: 24+48=72 bytes
struct CLBVH::FatLeafNode {
    // shared de-quantization scale and offset
    vec3f scale, offset;
    // 8 child boxes, in 8-bit fixed-point
    box3ui8 childBounds[8];
    // leaf data, stored right behint this node
    LeafPrimData childPrims[0]; };
```

FIG. 28

| | Embree "best speed" (SBVH, tris only) (leaves store full pre-gathered prims) | | | Embree "least memory" (BVH, tris only) (leaves store only vertex indices) | | | |
|---|---|---|---|---|---|---|---|
| | BVH8 uncomp | QBVH8 fully comp | CLBVH (ours) (fast) | BVH8 uncomp | QBVH8 fully comp | CLBVH (fast) | CLBVH (ours) (compact) |
| *Memory Consumption* | | | | | | | |
| san miguel | 711 | 643 | 643 | 380 | 318 | 317 | 257 |
| powerplant | 913 | 868 | 835 | 481 | 365 | 366 | 301 |
| villa | 2898 | 2625 | 2608 | 1440 | 1204 | 1192 | 1063 |
| boeing | 24074 | 21839 | 21833 | 12238 | 10226 | 10216 | 8782 |
| *Ray Tracing Performance* | | | | | | | |
| san miguel | 113 | 100 | 110 | -2.5% | 88.8 | 79.7 | -11.3% | 88.4 | -0.4% | 79.9 | -10.0% |
| powerplant | 188 | 153 | 181 | -4.0% | 90.2 | 76.8 | -14.8% | 86.8 | -3.7% | 80.0 | -11.2% |
| villa | 118 | 105 | 115 | -2.2% | 87.9 | 81.5 | -7.3% | 85.1 | | 82.2 | -6.4% |
| boeing | 111 | 99 | 108 | -3.3% | 68.2 | 60.4 | -11.4% | 66.7 | -2.2% | 63.0 | -7.5% |

FIG. 29

| | Embree "best speed" (SBVH, tris only) (leaves share full pre-gathered prims) | | | | | Embree "least memory" (BVH, tris only) (leaves store only vertex indices) | | | | | |
|---|---|---|---|---|---|---|---|---|---|---|---|
| | uncomp | fully comp | | CLBVH (ours) | | uncomp | fully comp | | CLBVH (ours) | | CLBVH (ours) |
| San Miguel | | | | | | | | | | | |
| BVH/QBVH | 152/- | -55.3 | -43.7% | 53.6/30.5 | -44.5% | 141/- | -79.5 | -43.7% | 50.3/28.4 | -44.3% | 50.3/28.4 | -25.1% |
| leaf data | 559 | 559 | -0.3% | 643 | -9.4% | 239 | 239 | -16.2% | 239 | -16.2% | 179 | -33.3% |
| total | 711 | 645 | | 16.8/5.1 | -2.5% | 380 | 318 | | 317 | | 257 | |
| travs/secs | 16.8/5.0 | 17.2/5.2 | | 110 | | 20.4/5.26 | 20.8/5.58 | -11.3% | 20.4/5.36 | -0.4% | 79.9 | -10.0% |
| MRays/s | 113 | 100 | -11.5% | | | 88.3 | 79.7 | | 88.4 | | | |
| Powerplant | | | | | | | | | | | |
| BVH/QBVH | 178/- | -103 | -41.8% | 68.5/33.9 | -42.3% | 151/- | -84.7 | -43.7% | 56.9/28.2 | -42.8% | 56.9/28.2 | -23% |
| leaf data | 735 | 735 | -4.9% | 733 | -8.5% | 280 | 280 | -24.1% | 280 | -23.8% | 214 | -37.4% |
| total | 913 | 868 | | 835 | | 431 | 365 | | 366 | | 301 | |
| travs/secs | 11.8/3.7 | 12.2/4.3 | -19.0% | 11.7/4.1 | -4.0% | 16.8/5.0 | 17.2/5.2 | -14.8% | 16.8/5.13 | -3.7% | 16.8/5.13 | -11.2% |
| MRays/s | 188 | 153 | | 131 | | 90.2 | 76.8 | | 86.8 | | 88.0 | |
| Villa | | | | | | | | | | | |
| BVH/QBVH | 625/- | -351 | -43.7% | 212/133 | -45.8% | 542/- | -305 | -43.7% | 185/116 | -45.8% | 185/116 | -15.2% |
| leaf data | 2273 | 2274 | -9.4% | 2273 | -10.1% | 899 | 899 | -16.4% | 899 | -17.3% | 762 | -26.2 |
| total | 2898 | 2625 | | 2608 | | 1440 | 1204 | | 1192 | | 1063 | |
| travs/secs | 15.2/4.82 | 15.3/5.0 | -10.7% | 15.2/4.95 | -2.2% | 17.5/5.56 | 17.9/5.77 | -7.3% | 17.5/5.67 | 4.0% | 17.5/5.67 | -6.4% |
| MRays/s | 118 | 105 | | 115 | | 97.9 | 81.5 | | 82.1 | | 82.3 | |
| Boeing | | | | | | | | | | | |
| BVH/QBVH | 5123/- | -2887 | -43.7% | 1879/1033 | -43.6% | 4598/- | -2586 | -43.8% | 1661/915 | -44.0% | 1661/915 | -18.7% |
| leaf data | 18942 | 18942 | -0.3% | 18941 | -9.3% | 7640 | 7640 | -16.4% | 7640 | -16.5% | 6206 | -35.2% |
| total | 24074 | 21829 | | 21835 | | 12248 | 10226 | | 10216 | | 8762 | |
| travs/secs | 16.0/5.0 | 16.3/5.9 | -11.5% | 16.0/5.7 | -3.3% | 25.3/7.98 | 26.0/8.27 | -11.4% | 25.3/8.05 | -2.2% | 25.3/8.05 | -35.2% |
| MRays/s | 111.4 | 98.5 | | 108 | | 68.2 | 69.4 | | 66.7 | | 63.0 | -7.5% |

FIG. 30

APPARATUS AND METHOD FOR COMPRESSING LEAF NODES OF A BOUNDING VOLUME HIERARCHY (BVH)

CROSS REFERENCE TO RELATED APPLICATION

This application claims the benefit of U.S. Provisional Patent Application No. 62/656,349, filed Apr. 11, 2018, all of which is herein incorporated by reference.

BACKGROUND

Field of the Invention

This invention relates generally to the field of graphics processors. More particularly, the invention relates to an apparatus and method for compressing leaf nodes of a bounding volume hierarchy (BVH).

Description of the Related Art

Ray tracing is a technique in which a light transport is simulated through physically-based rendering. Widely used in cinematic rendering, it was considered too resource-intensive for real-time performance until just a few years ago. One of the key operations in ray tracing is processing a visibility query for ray-scene intersections known as "ray traversal" which computes ray-scene intersections by traversing and intersecting nodes in a bounding volume hierarchy (BVH).

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 19 is a block diagram of a composite floating point data block for use by a quantized BVH node according to a further embodiment;

FIG. 28 illustrates code associated with three BVH node types;

FIG. 29 compares embodiments of the invention with existing implementations with respect to memory consumption (in MB) and total rendering performance (in fps); and FIG. 30 is used to compare existing implementations with embodiments of the invention with respect to memory consumption (in MB), traversal statistics and total performance.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
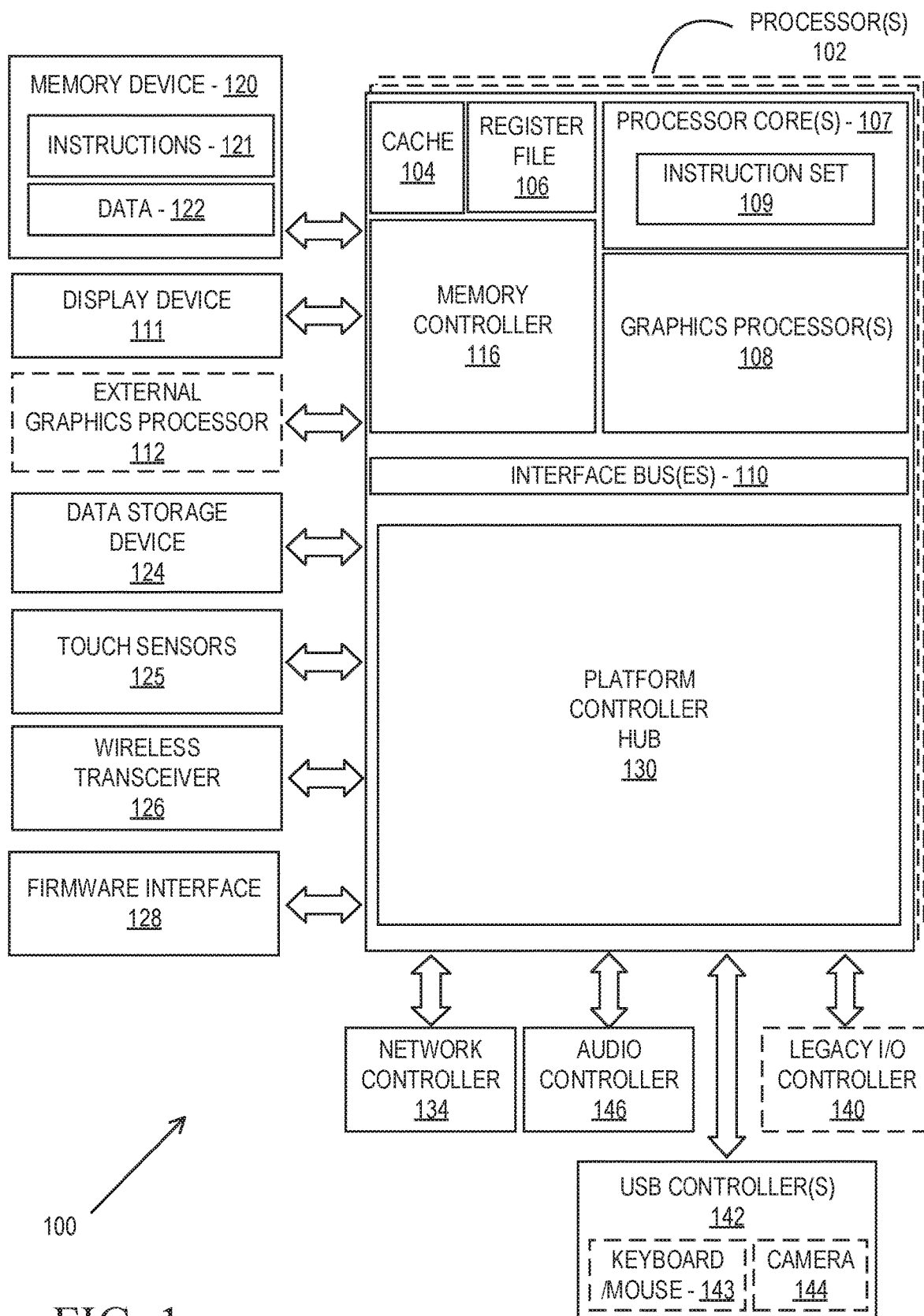
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 1160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
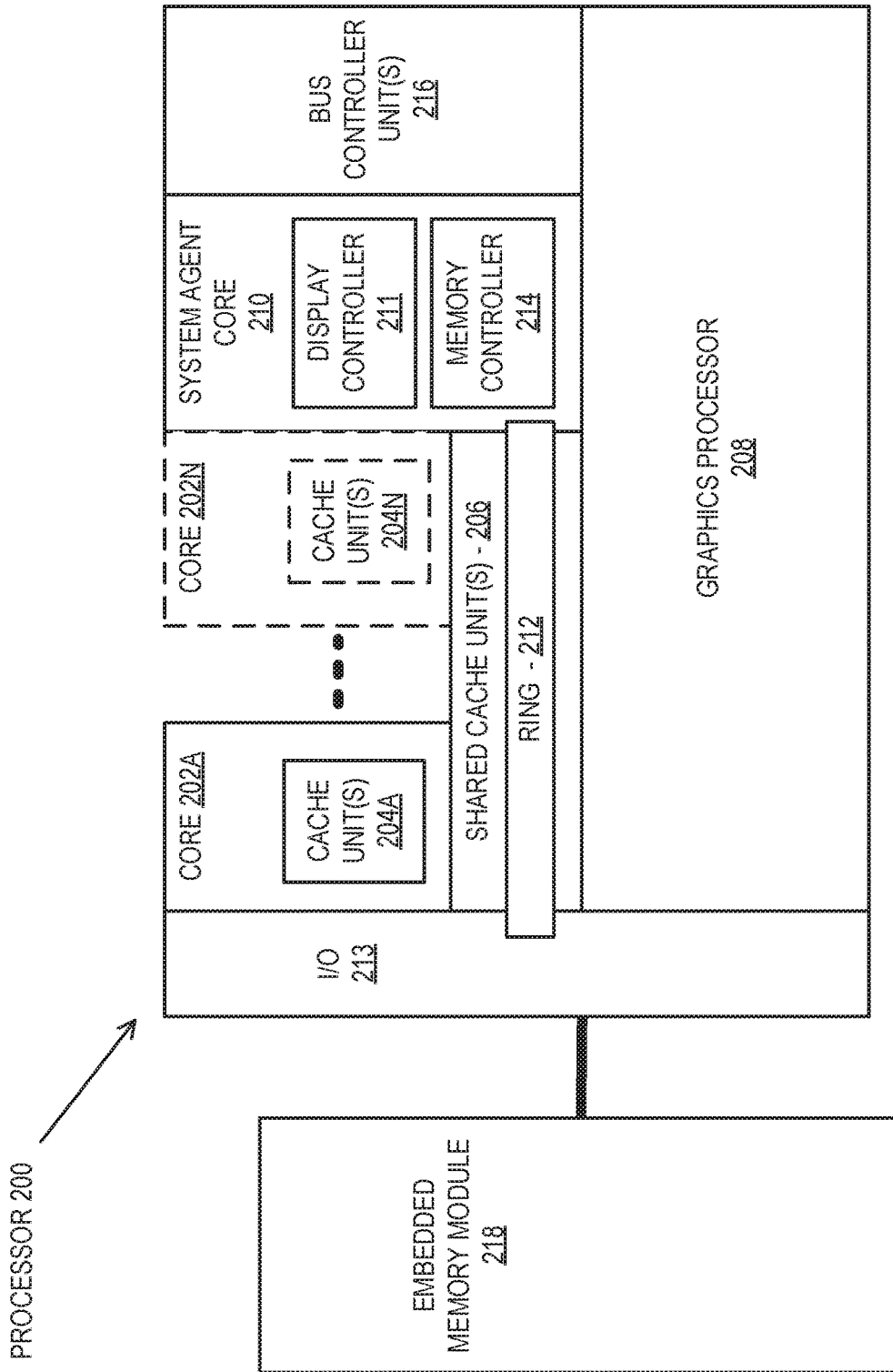
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
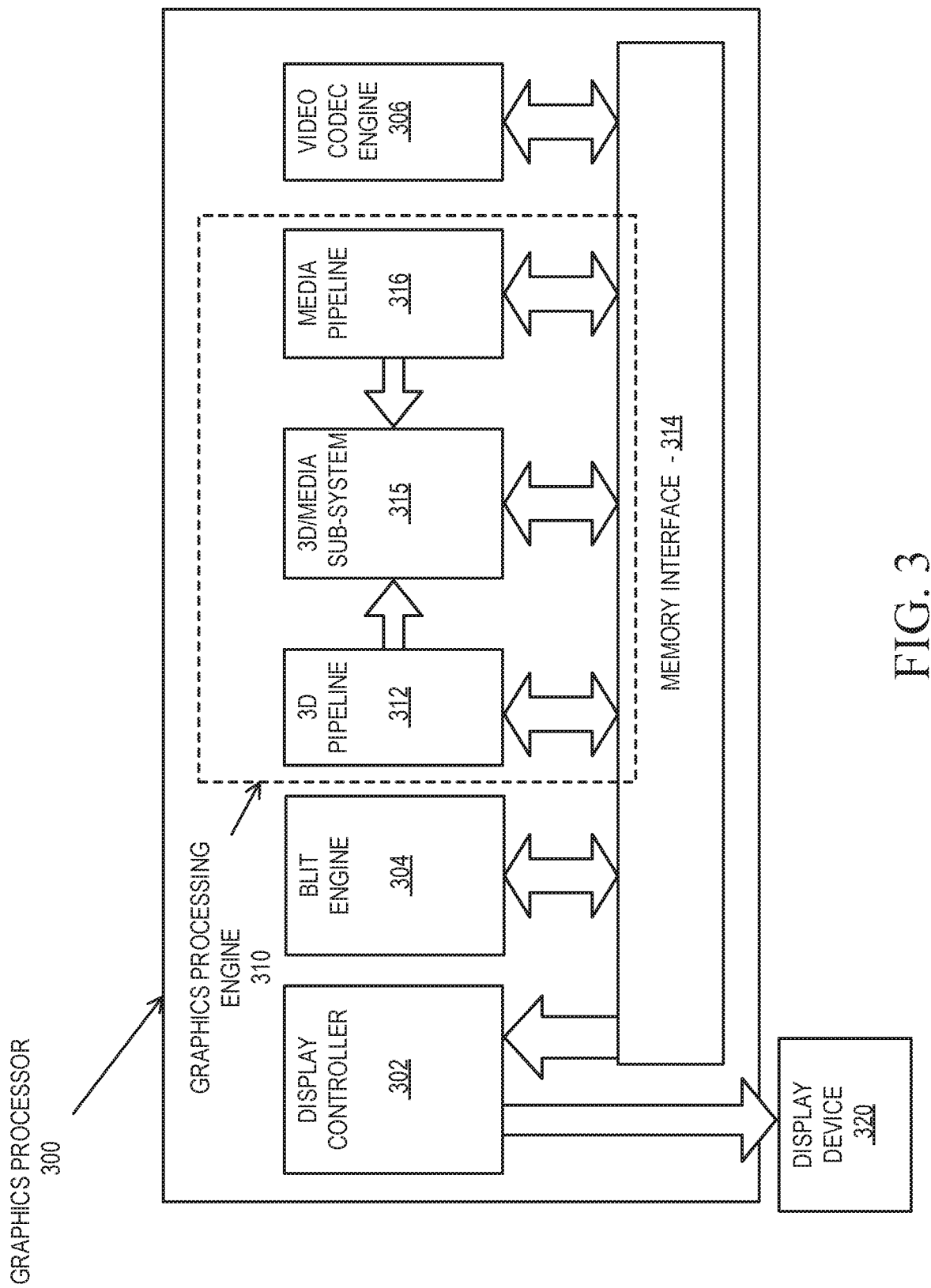
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
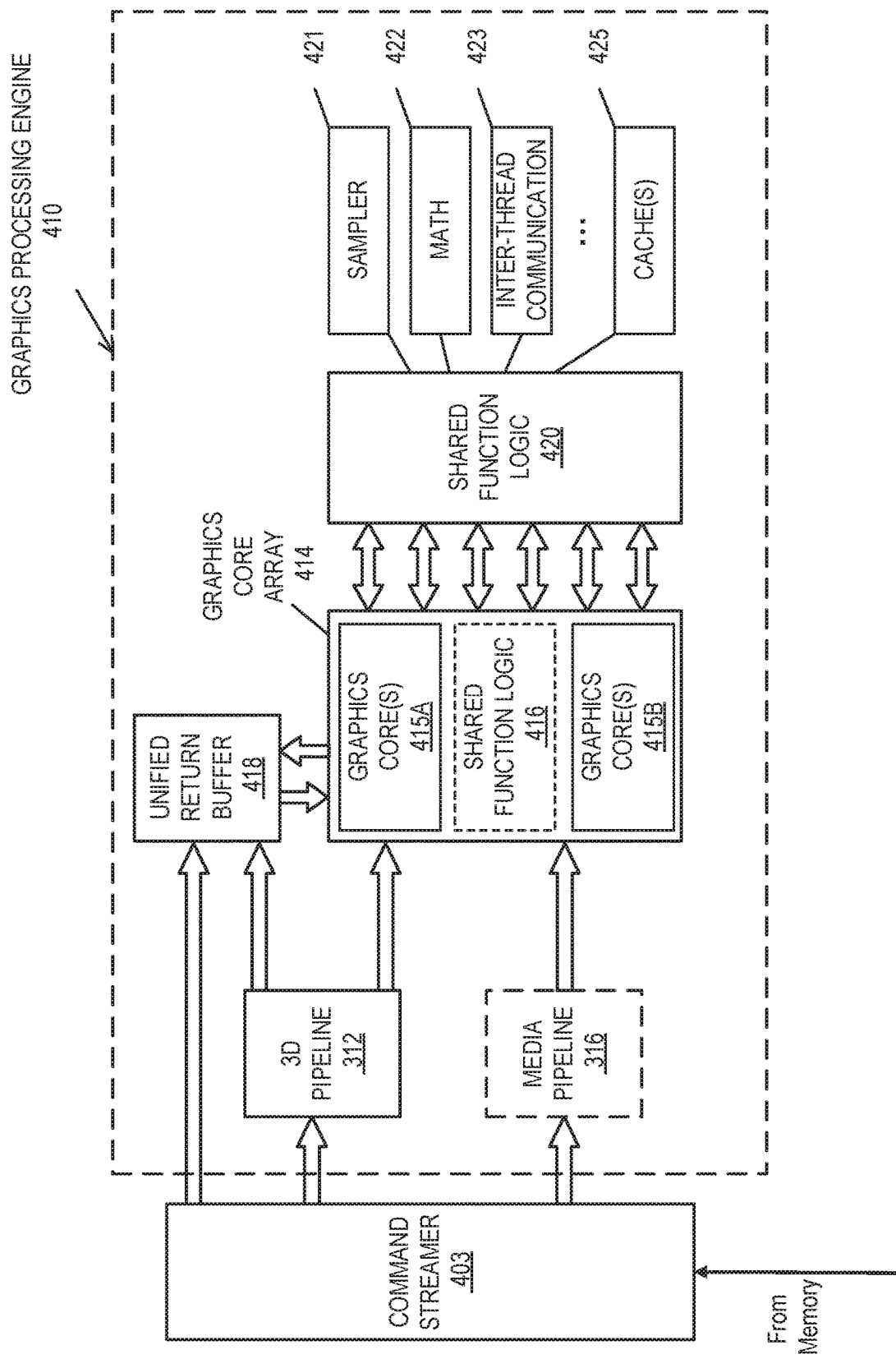
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
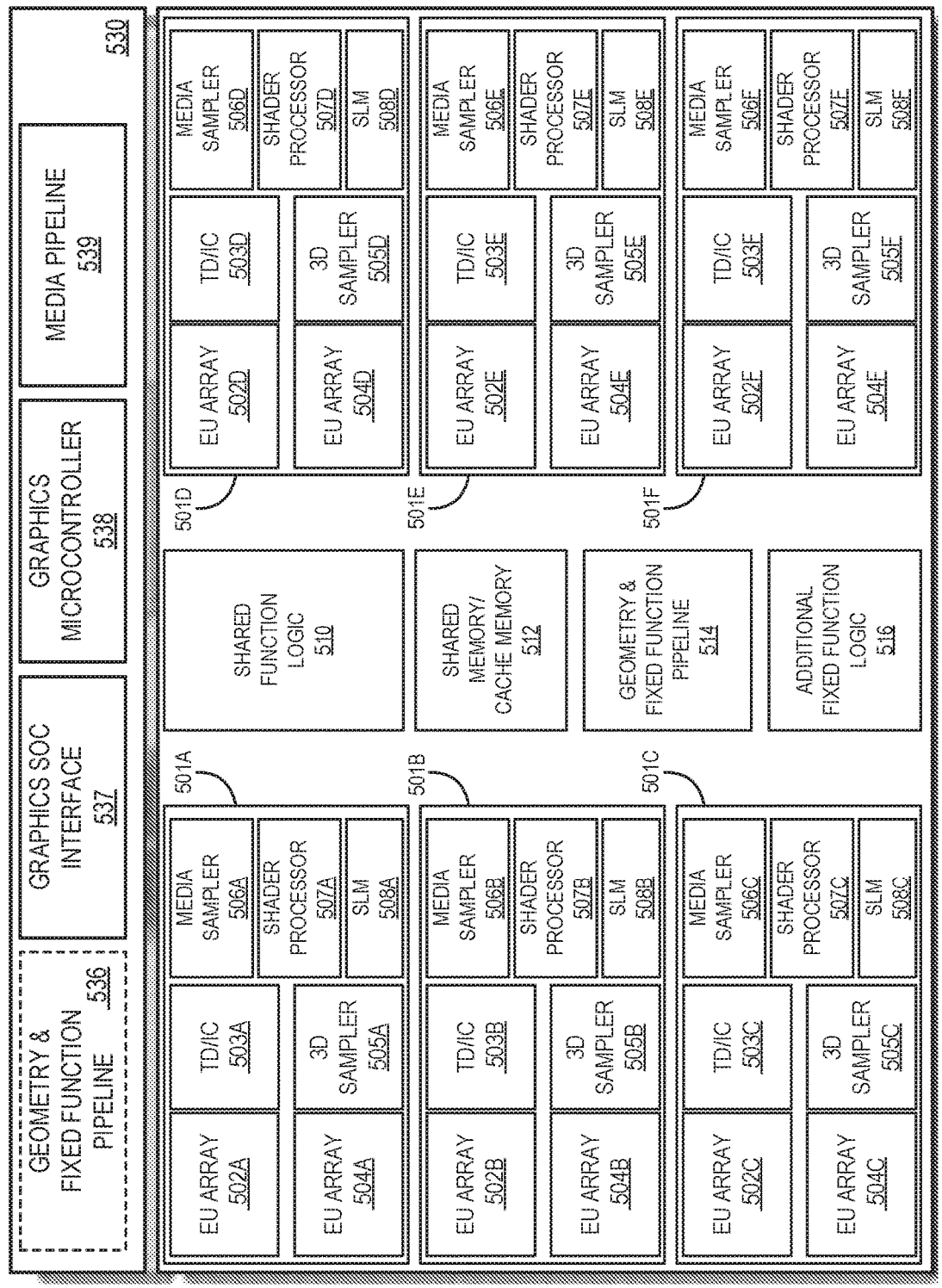
FIG. 5 is a block diagram of another embodiment of a graphics processor.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics processor core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor core 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics processor core 500 and other processor cores within a system on a chip integrated circuit. The graphics microcontroller 538 is a programmable sub-processor that is configurable to manage various functions of the graphics processor core 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics processor core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics processor core 500 and CPUs within the SoC. The SoC interface 537 can also implement power management controls for the graphics processor core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics processor core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics processor core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics processor core 500, providing the graphics processor core 500 with the ability to save and restore registers within the graphics processor core 500 across low-power state transitions independently from the operating system and/or graphics driver software on the system.

The graphics processor core 500 may have greater than or fewer than the illustrated sub-cores 501A-501F, up to N modular sub-cores. For each set of N sub-cores, the graphics processor core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics processor core 500. The shared and/or cache memory 512 can be a last-level cache for the set of N sub-cores 501A-501F within the graphics processor core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics processor core 500 includes additional fixed function logic 516 that can include various fixed function acceleration logic for use by the graphics processor core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
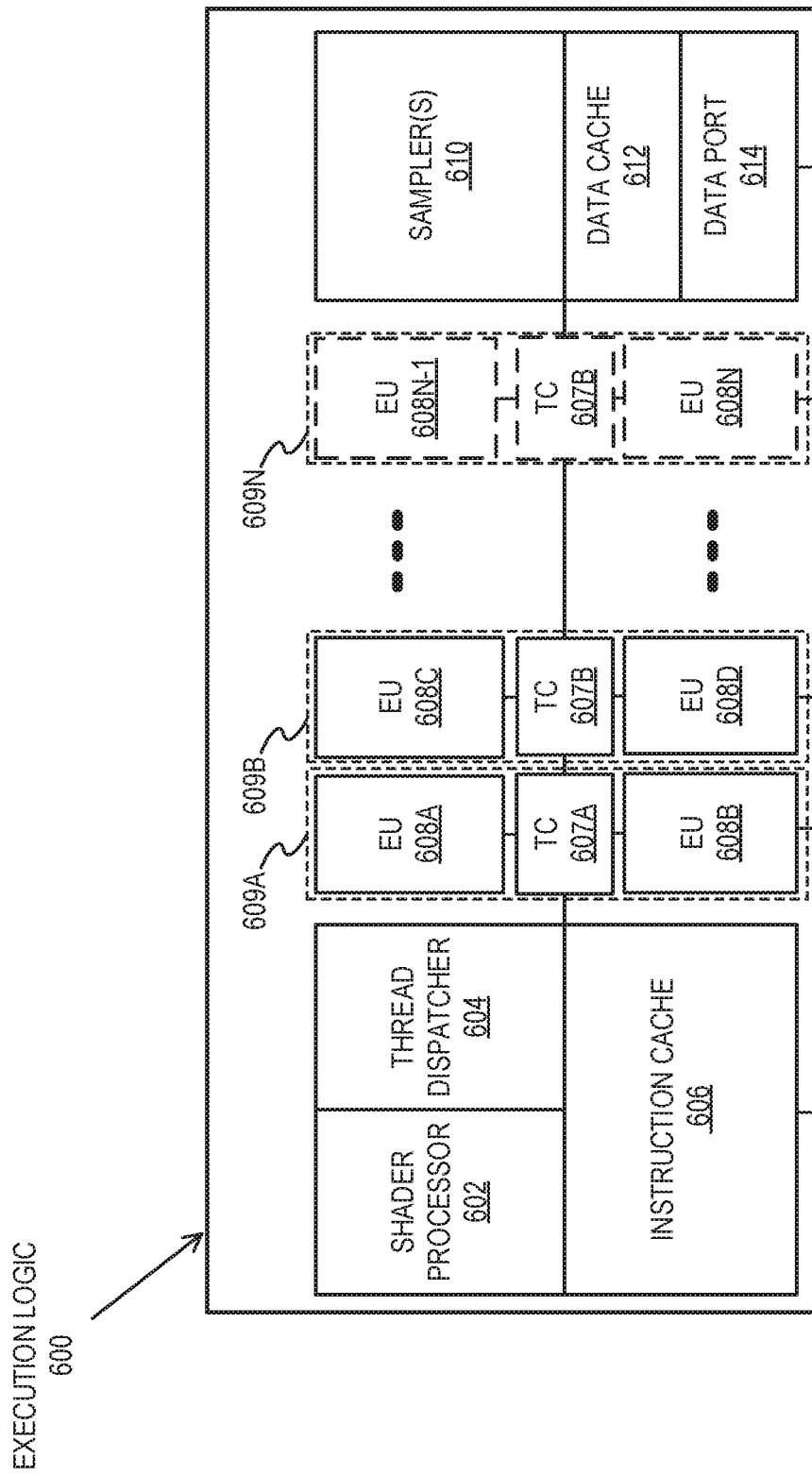
FIGS. 6A-B illustrate examples of execution circuitry and logic.
Figure 6B:
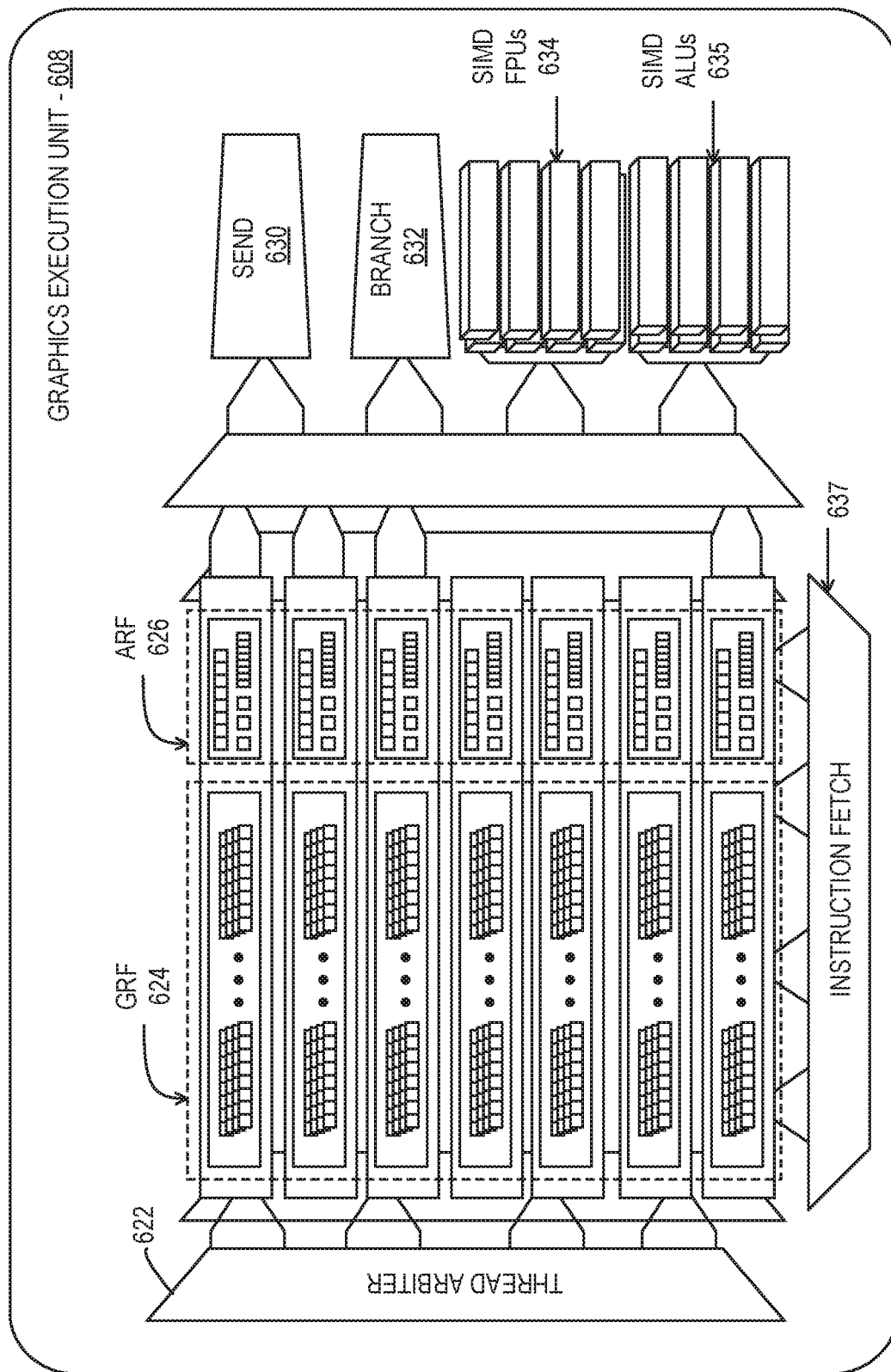

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N−1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 6342, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
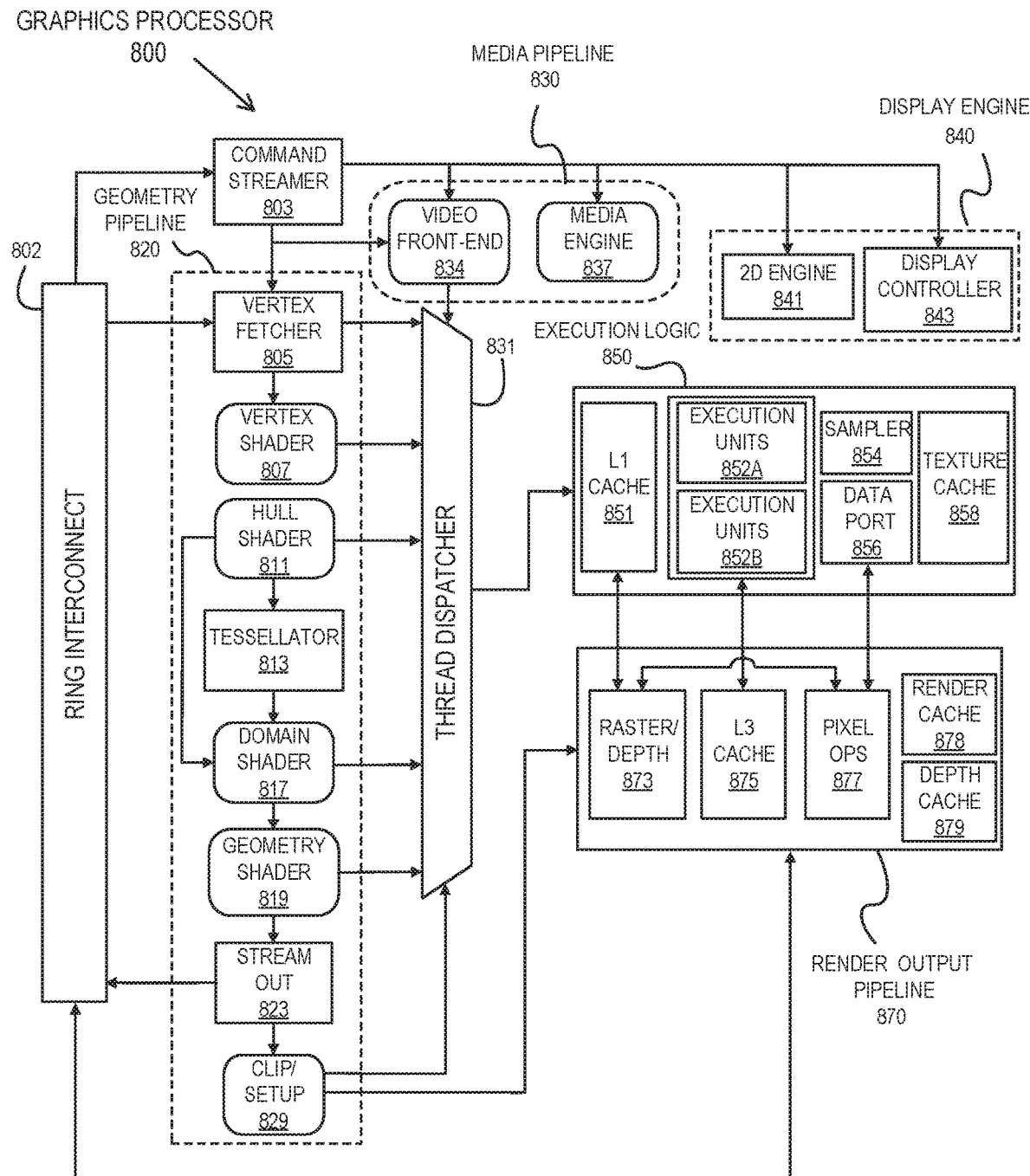
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
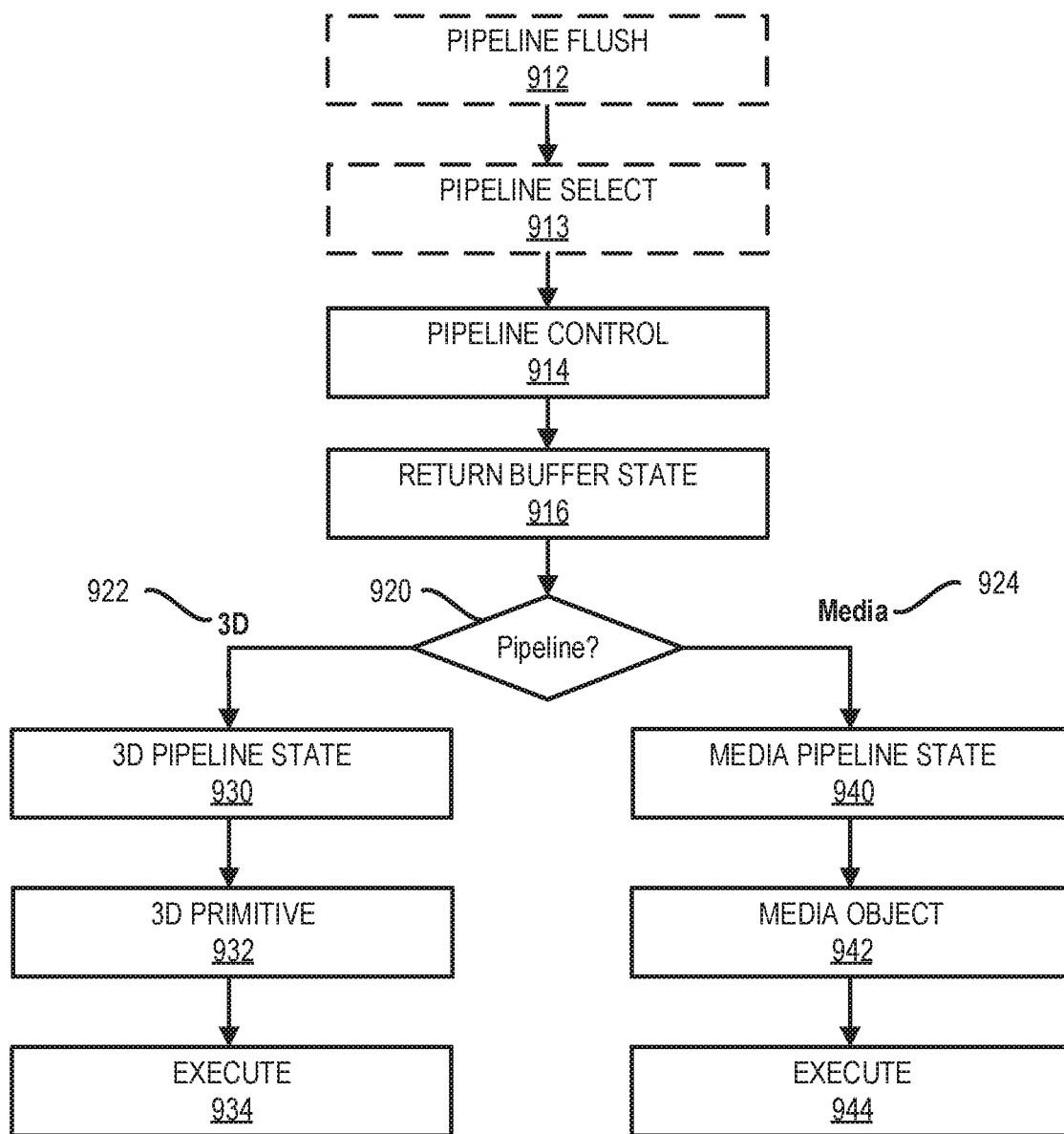
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
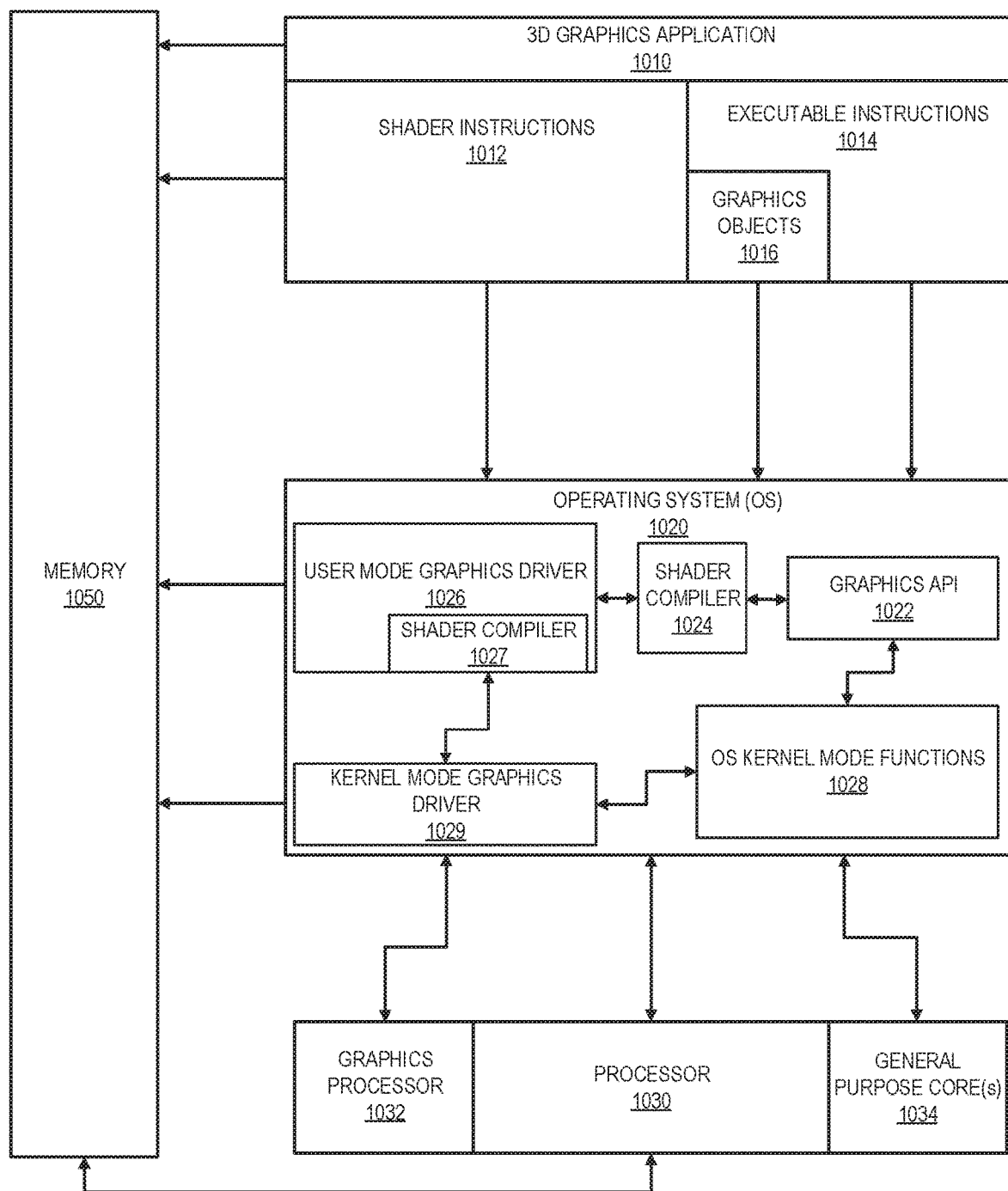
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
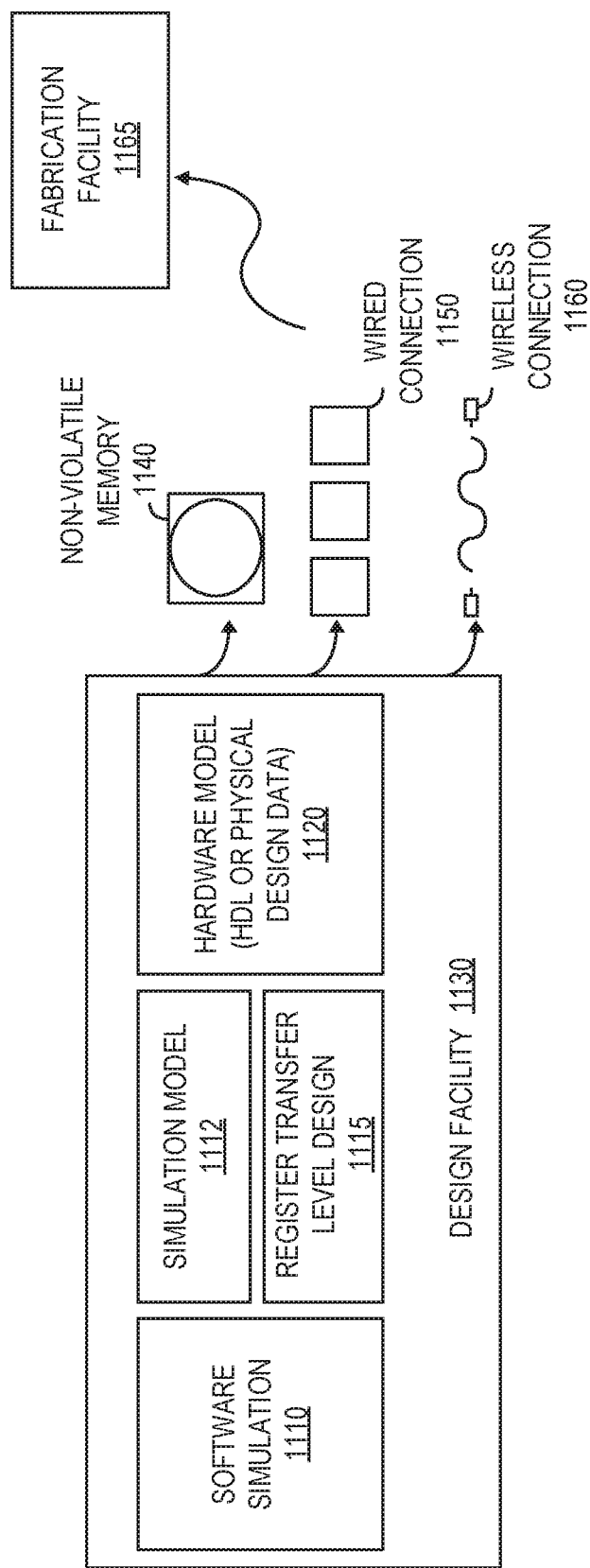
FIGS. 11A-B illustrate an exemplary IP core development system that may be used to manufacture an integrated circuit and an exemplary package assembly.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
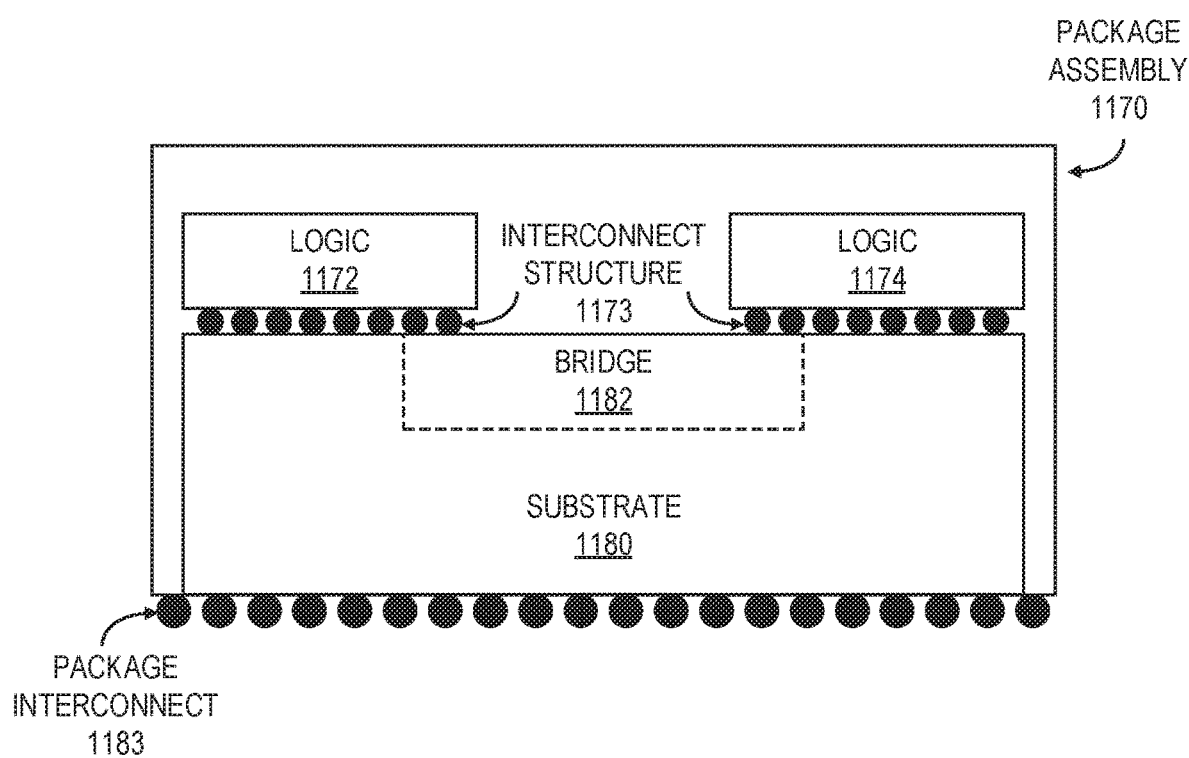

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
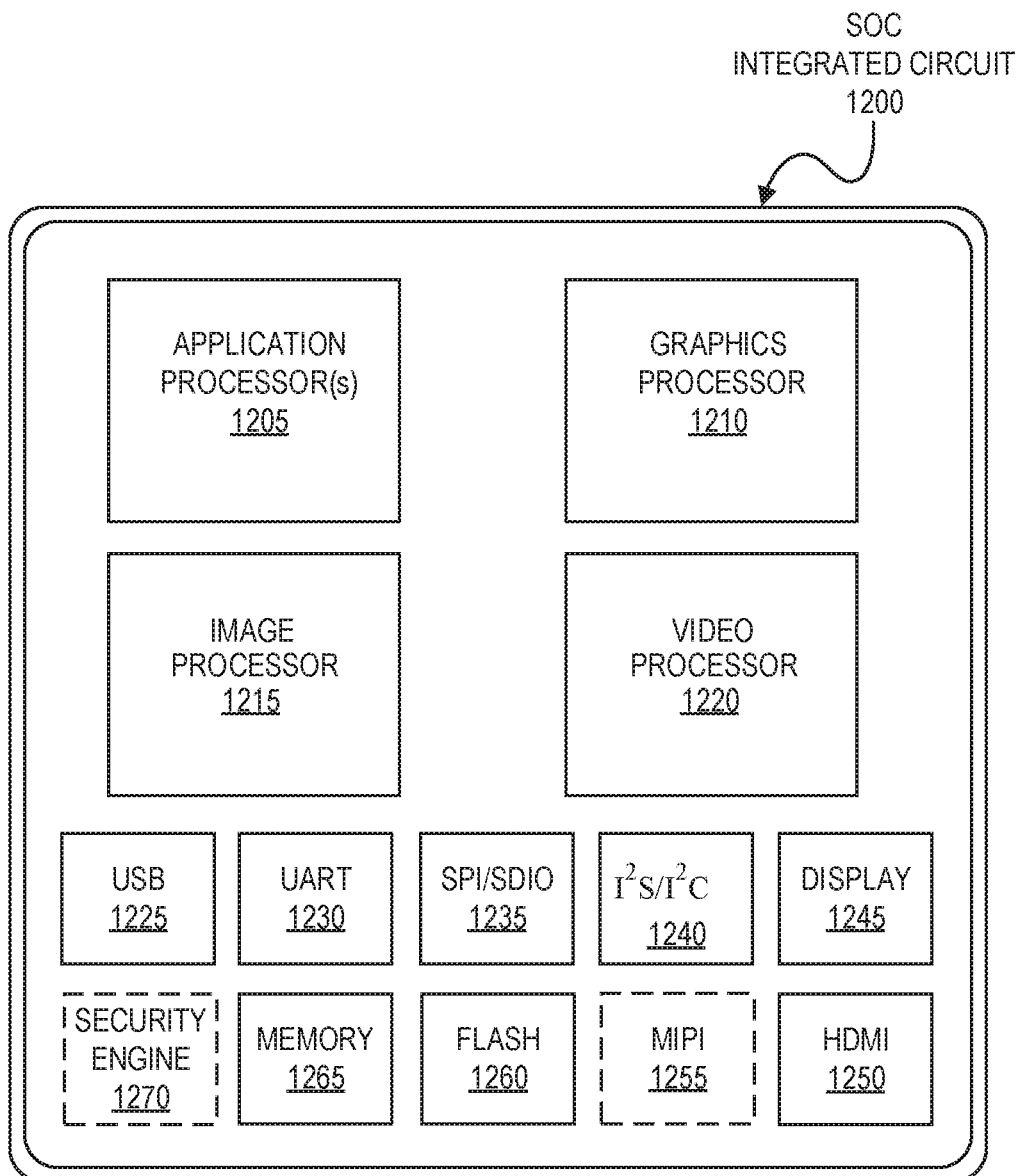
FIG. 12 illustrates an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
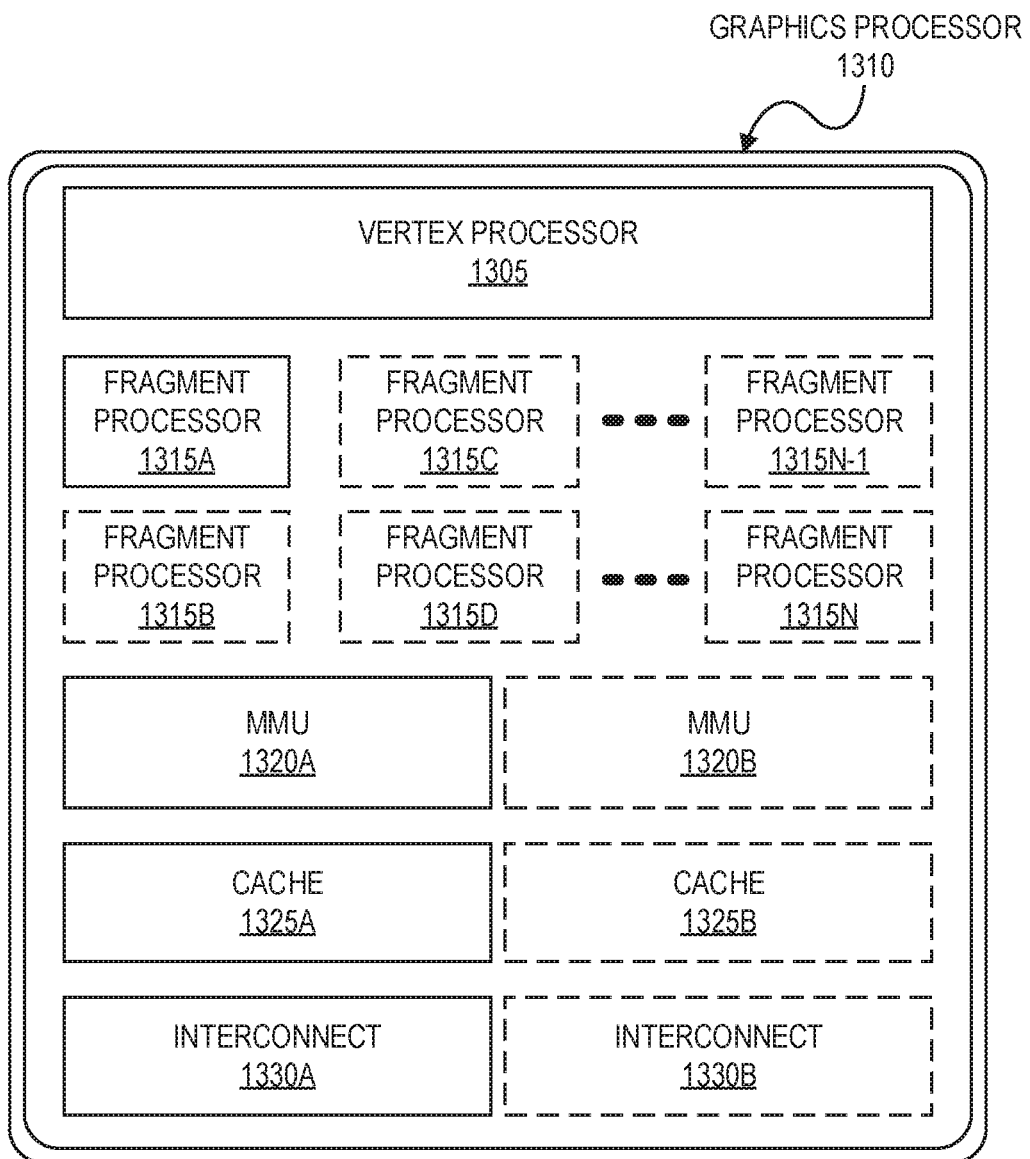
FIG. 13A-B illustrate an exemplary graphics processor of a system on a chip integrated circuit that may be fabricated using one or more IP cores.
Figure 13B:
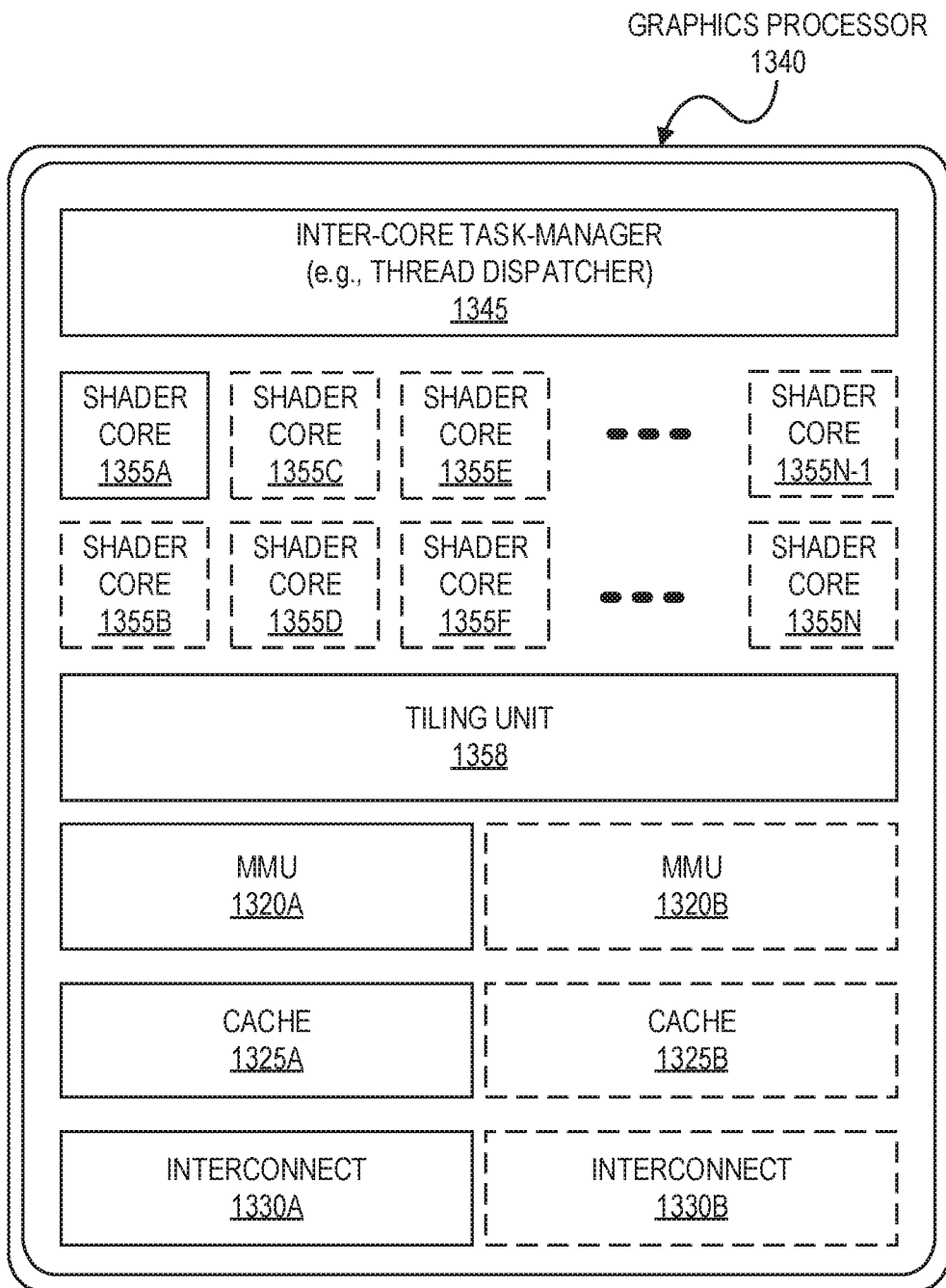

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N–1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N−1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
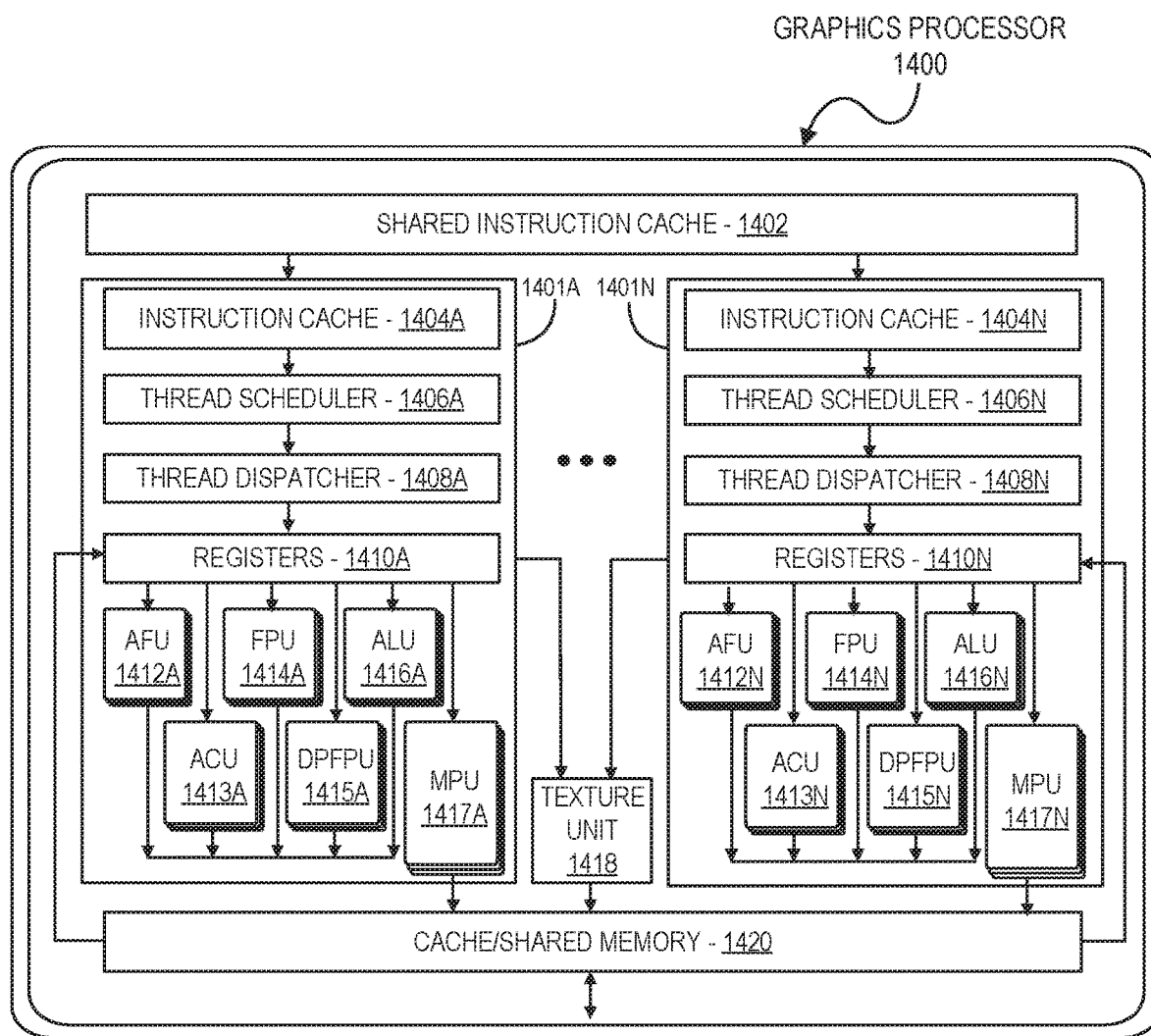
FIG. 14A-B illustrate exemplary graphics processor architectures.
Figure 14B:
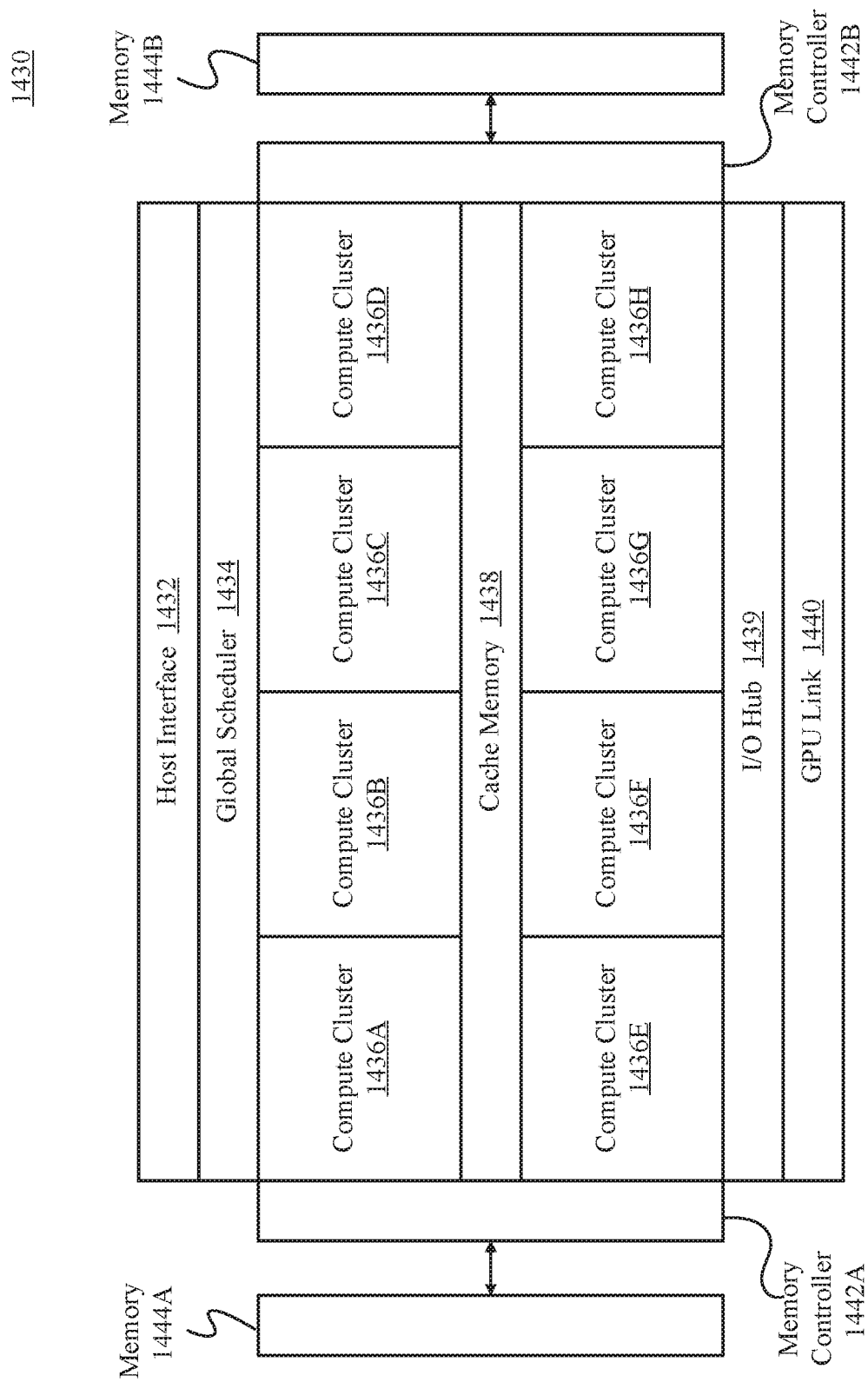

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates an additional highly-parallel general-purpose graphics processing unit 1430, which is a highly-parallel general-purpose graphics processing suitable unit suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A-1440N. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 14434A-14434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Apparatus and Method for Bounding Volume Hierarchy (BVH) Compression

An N-wide bounding volume hierarchy (BVH) node includes N bounding volumes that correspond to the N children of the given node. In addition to a bounding volume, a reference to each child node is included as either an index or a pointer. One bit of the index or pointer can be assigned to indicate whether the node is an internal node or a leaf node. A commonly used bounding volume format, particularly for ray tracing, is the axis-aligned bounding volume (AABV) or axis-aligned bounding box (AABB). An AABB can be defined only with the minimum and maximum extents in each dimension, providing for an efficient ray intersection test.

Typically, an AABB is stored in an uncompressed format using single-precision (e.g., 4-byte) floating-point value. To define an uncompressed three-dimensional AABB, two single precision floating point values (min/max) for each of three axes are used (e.g., 2×3×4), resulting in 24-bytes to store the extents of the AAAB, plus the index or pointer to the child node (e.g., a 4-byte integer or an 8-byte pointer). Accordingly, each AABB defined for a BVH node may be up to 32-bytes. Thus, a binary BVH node with children may require 64 bytes, a 4-wide BVH node may require 128 bytes, and an 8-wide BVH may require up to 256 bytes.

Oriented bounding boxes using discrete oriented polytopes in k-directions (k-DOPs) are also a commonly used bounding volume format that may be used with embodiments described herein. For k-DOPs, lower and upper bounds are stored for multiple arbitrary directions. In contrast to AABBs, k-DOPs are not limited to bounds in the direction of the coordinate axes only, but bound the geometry in any number of directions in space.

To reduce the memory size requirements for using a bounding volume hierarchy (BVH), the BVH data may be stored in a compressed format. For example, each AABB can be stored in a hierarchically compressed format relative the parent of the AABB. However, hierarchical encoding may cause issues with ray tracing implementations when BVH node references are pushed on to the stack during ray traversal. When later dereferenced, the path to the root node is followed to compute the final AABB, potentially resulting in long dependency chain. An alternative solution stores the current AABB on the stack, which requires a significant amount of stack memory to store the additional data, as the stack depth per ray typically ranges between 40 to 60 entries.

Embodiments described herein provide for an apparatus, system, method, and various logical processes for compressing BVH nodes in a simple and efficient manner, without requiring a reference to the parent node or extra stack storage space to decompress the child bounds of a node, significantly reducing the complexity of implementing ray tracing acceleration hardware.

In one embodiment, to reduce memory requirements, N child bounding boxes of an N-wide BVH node are encoded relative to the merged box of all children by storing the parent bounding box with absolute coordinates and full (e.g., floating point) precision, while the child bounding boxes are stored relative to the parent bounding box with lower precision.

The approach described herein reduces memory storage and bandwidth requirements compared to traditional approaches that store full precision bounding boxes for all children. Each node may be decompressed separately of other nodes. Consequently, complete bounding boxes are not stored on the stack during traversal and the entire path from the root of the tree is not re-traversed to decompress nodes on pop operations. Additionally, ray-node intersection testing can be performed at reduced precision, reducing the complexity required within the arithmetic hardware units.

Bounding Volumes and Ray-Box Intersection Testing

Figure 15:
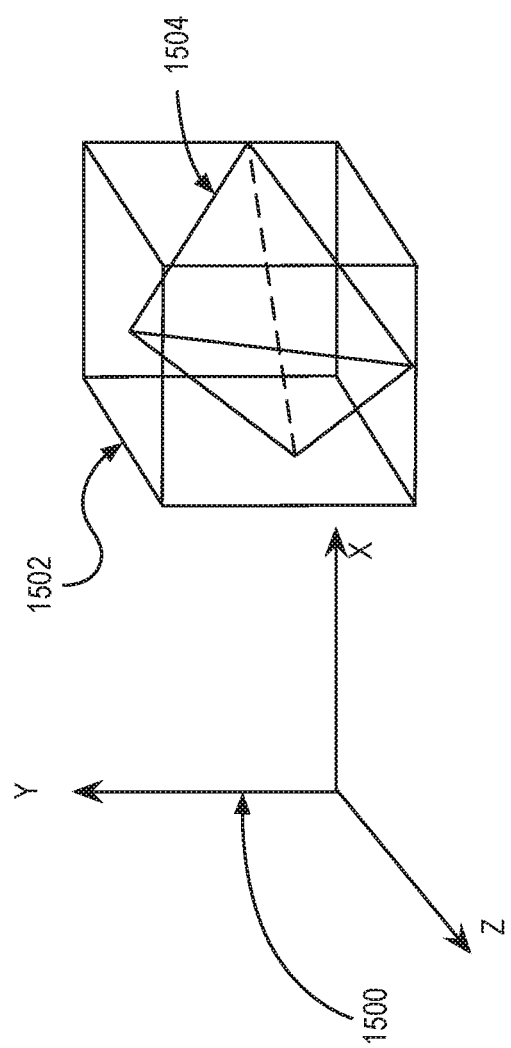
FIG. 15 is an illustration of a bounding volume, according to embodiments.

FIG. 15 is an illustration of a bounding volume 1502, according to embodiments. The bounding volume 1502 illustrated is axis aligned to a three dimensional axis 1500. However, embodiments are applicable to different bounding representations (e.g., oriented bounding boxes, discrete oriented polytopes, spheres, etc.) and to an arbitrary number of dimensions. The bounding volume 1502 defines a minimum and maximum extent of a three dimensional object 1504 along each dimension of the axis. To generate a BVH for a scene, a bounding box is constructed for each object in the set of objects in the scene. A set of parent bounding boxes can then be constructed around groupings of the bounding boxes constructed for each object.

Figure 16B:
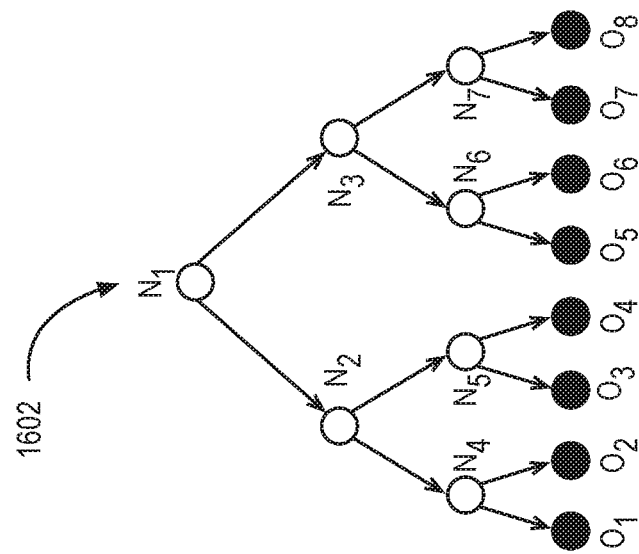
FIGS. 16A-B illustrate a representation of a bounding volume hierarchy.
Figure 16A:
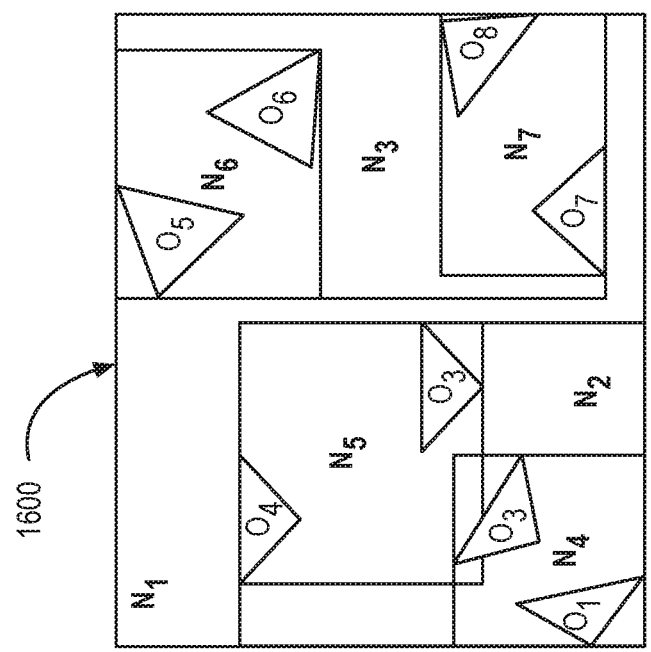

FIGS. 16A-B illustrate a representation of a bounding volume hierarchy for two dimensional objects. FIG. 16A shows a set of bounding volumes 1600 around a set of geometric objects. FIG. 16B shows an ordered tree 1602 of the bounding volumes 1600 of FIG. 16A.

As shown in FIG. 16A, the set of bounding volumes 1600 includes a root bounding volume $N_1$, which is a parent bounding volume for all other bounding volumes $N_2$-$N_7$. Bounding volumes $N_2$ and $N_3$ are internal bounding volumes between the root volume $N_1$ and the leaf volumes $N_4$-$N_7$. The leaf volumes $N_4$-$N_7$ include geometric objects $O_1$-$O_8$ for a scene.

FIG. 16B shows an ordered tree 1602 of the bounding volumes $N_1$-$N_7$ and geometric objects $O_1$-$O_8$. The illustrated ordered tree 1602 is a binary tree in which each node of the tree has two child nodes. A data structure configured to contain information for each node can include bounding information for the bounding volume (e.g., bounding box) of the node, as well as at least a reference to the node of each child of the node.

The ordered tree 1602 representation of the bounding volumes defines a hierarchy that can be used to perform a hierarchical version of various operations including, but not limited to collision detection and ray-box intersection. In the instance of ray-box intersection, nodes can be tested in a hierarchical fashion beginning with the root node $N_1$ which is the parent node to all other bounding volume nodes in the hierarchy. If the ray-box intersection test for the root node $N_1$ fails, all other nodes of the tree may be bypassed. If the ray-box intersection test for the root node $N_1$ passes, sub-trees of the tree can be tested and traversed or bypassed in an ordered fashion until, at the least, the set of intersected leaf nodes $N_4$-$N_7$ are determined. The precise testing and traversal algorithms used can vary according to embodiments.

Figure 17:
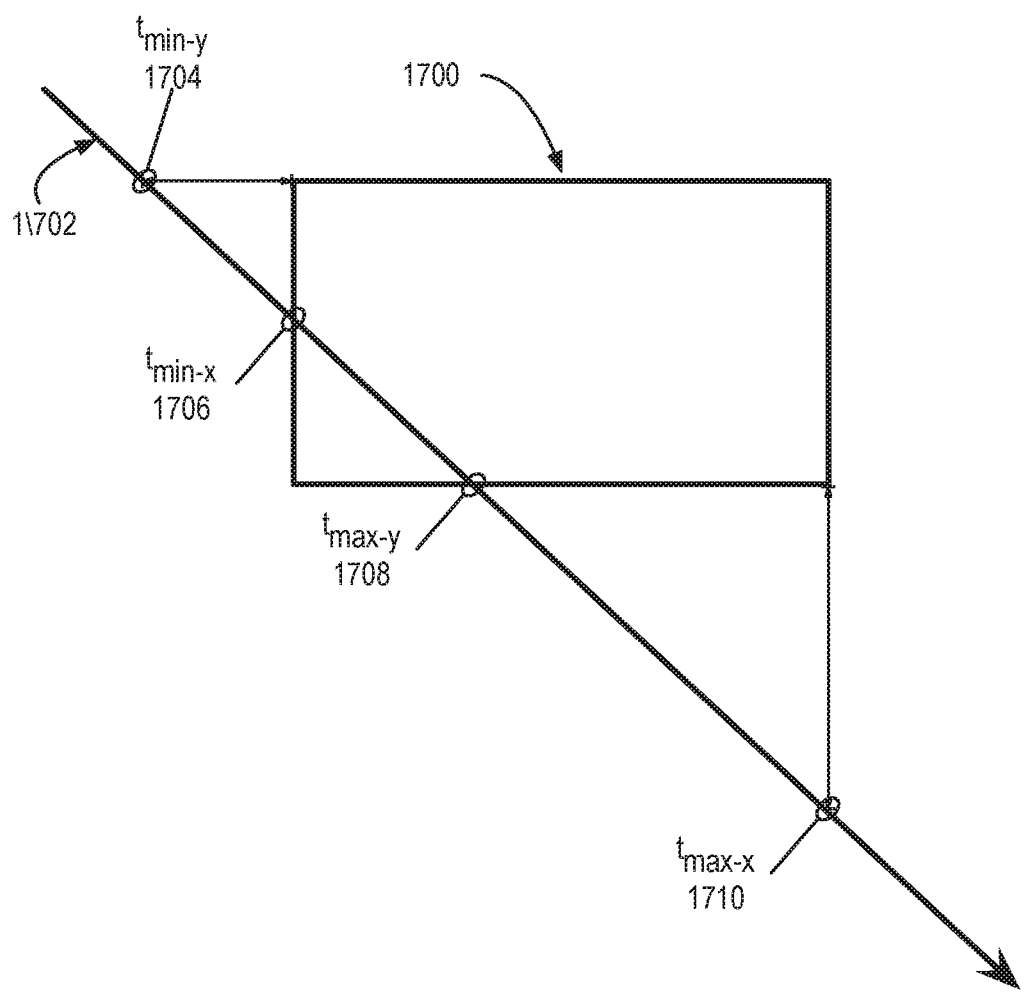
FIG. 17 is an illustration of a ray-box intersection test, according to an embodiment.

FIG. 17 is an illustration of a ray-box intersection test, according to an embodiment. During the ray-box intersection test, a ray 1702 is cast and the equation defining the ray can be used to determine whether the ray intersects the planes that define the bounding box 1700 under test. The ray 1702 can be expressed as O+D·t where O corresponds to the origin of the ray D is the direction of the ray and t is a real value. Changing t can be used to define any point along the ray. The ray 1702 is said to intersect the bounding box 1700 when the largest entry plane intersection distance is smaller than or equal to the smallest exit plane distance. For the ray 1702 of FIG. 17, the y plane entry intersection distance is shown as $t_{min-y}$ 1704. The y plane exit intersection distance is shown as $t_{max-y}$ 1708. The x plane entry intersection distance can be calculated at $t_{min-x}$ 1706, the x plane exit intersection distance is shown as $t_{max-x}$ 1710. Accordingly, the given ray 1702 can be mathematically shown to intersect the bounding box, at least along the x and y planes, because $t_{min-x}$ 1706 is less than $t_{max-y}$ 1708. To perform the ray-box intersection test using a graphics processor, the graphics processor is configured to store an acceleration data structure that defines, at the least, each bounding box to be tested. For acceleration using a bounding volume hierarchy, at the least, a reference to the child nodes to the bounding box is stored.

Bounding Volume Node Compression

For an axis-aligned bounding box in 3D space, the acceleration data structure can store the lower and upper bounds of the bounding box in three dimensions. A software implementation can use 32-bit floating point numbers to store these bounds, which adds up to 2×3×4=24-bytes per bounding box. For an N-wide BVH node one has to store N boxes and N child references. In total, the storage for a 4-wide BVH node is N*24 bytes plus N*4 bytes for the child reference, assuming 4 bytes per reference, which results in a total of (24+4)*N bytes, for a total of 112 bytes for a 4-wide BVH node and 224 bytes for an 8-wide BVH node.

In one embodiment the size of a BVH node is reduced by storing a single higher accuracy parent bounding box that encloses all child bounding boxes, and storing each child bounding box with lower accuracy relative to that parent box. Depending on the usage scenario different number representations may be used to store the high accuracy parent bounding box and the lower accuracy relative child bounds.

Figure 18:
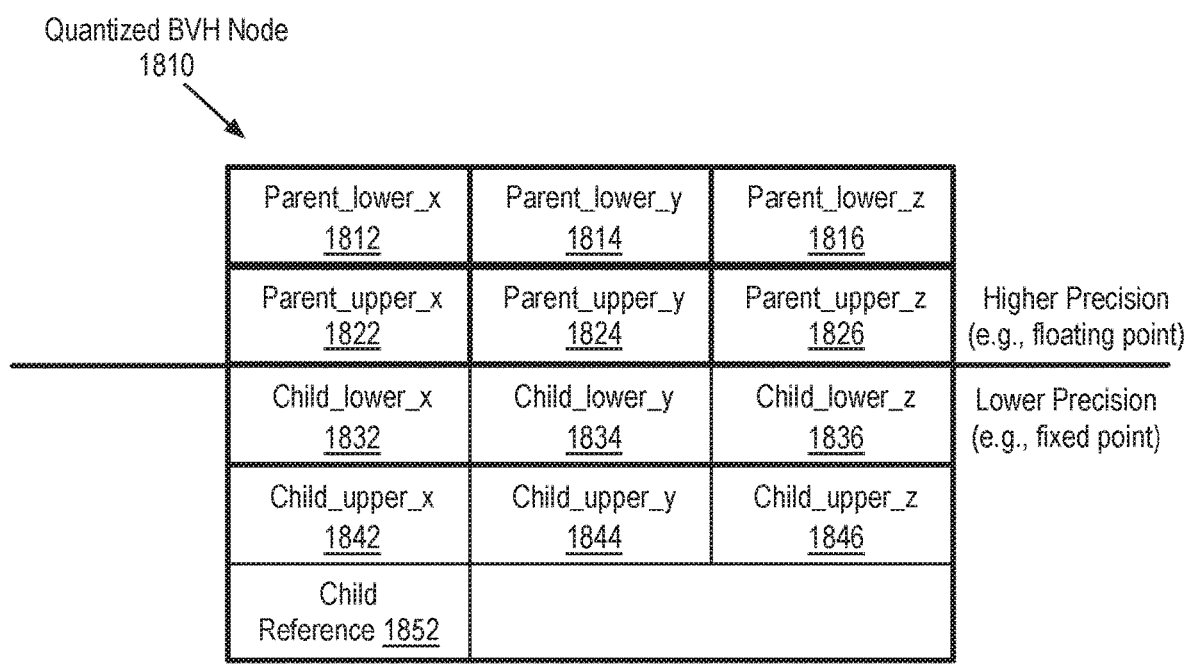
FIG. 18 is a block diagram illustrating an exemplary quantized BVH node according to an embodiment.

FIG. 18 is a block diagram illustrating an exemplary quantized BVH node 1810, according to an embodiment. The quantized BVH node 1810 can include higher precision values to define a parent bounding box for a BVH node. For example, parent_lower_x 1812, parent_lower_y 1814, parent_lower_z 1816, parent_upper_x 1822, parent_upper_y 1824, and parent_upper_z 1826 can be stored using single or double precision floating-point values. The values for the child bounding box for each child bounding box stored in the node can be quantized and stored as lower precision values, such as fixed point representations for bounding box values that are defined relative to the parent bounding box. For example, child_lower_x 1832, child_lower_y 1834, child_lower_z 1836, as well as child_upper_x 1842, child_upper_y 1844, and child_upper_z 1846 can be stored as lower precision fixed point values. Additionally a child reference 1852 can be stored for each child. The child reference 1852 can be an index into a table that stores the location of each child node or can be a pointer to the child node.

As shown in FIG. 18, a single or double precision floating-point value may be used to store the parent bounding box, while M-bit fixed point values may be used to encode the relative child bounding boxes. A data structure for the quantized BVH node 1810 of FIG. 18 can be defined by the quantized N-wide BVH node shown in Table 1 below.

TABLE 1

Quantized N-wide BVH Node.
struct QuantizedNode

```
{
  Real parent_lower_x, parent_lower_y, parent_lower_z;
  Real parent_upper_x, parent_upper_y, parent_upper_z;
  UintM child_lower_x[N], child_lower_y[N], child_lower_z[N];
  UintM child_upper_x[N], child_upper_y[N], child_upper_z[N];
  Reference child [N];
};
```

The quantized node of Table 1 realizes a reduced data structure size by quantizing the child values while maintaining a baseline level of accuracy by storing higher precision values for the extents of the parent bounding box. In Table 1, Real denotes a higher accuracy number representation (e.g. 32-bit or 64-bit floating values), and UintM denotes lower accuracy unsigned integer numbers using M-bits of accuracy used to represent fixed point numbers. Reference denotes the type used to represent references to child nodes (e.g. 4-byte indices of 8-byte pointers).

A typical instantiation of this approach can use 32-bit child references, single precision floating point values for the parent bounds, and M=8 bits (1 byte) for the relative child bounds. This compressed node would then require 6*4+6*N+4*N bytes. For a 4-wide BVH this totals 64 bytes (compared to 112 bytes for the uncompressed version) and for an 8-wide BVH this totals 104 Bytes (compared to 224 bytes for the uncompressed version).

To traverse such a compressed BVH node, graphics processing logic can decompress the relative child bounding boxes and then intersect the decompressed node using standard approaches. The uncompressed lower bound can then be obtained for each dimension x, y, and z. Equation 1 below shows a formula to obtain a child lower_x value.

Child node decompression for *BVH* Node.

Equation 1

$$child_{lower_x} = parent_{lower_x} + child_{lower_x} \times \frac{parent_{upper_x} - parent_{lower_x}}{(2^M - 1)}$$

In Equation 1 above, M represents the number of bits of accuracy for the fixed point representation of the child bounds. Logic to decompress child data for each dimension of the BVH node can be implemented as in Table 2 below.

TABLE 2

Child Node Decompression for a BVH Node float child_lower_x = node.parent_lower.x + node.child_lower_x[i]/
(2^M-1)*(node.parent_upper_x-node.parent_lower_x);
float child_lower_y = node.parent_lower.y + node.child_lower_y[i]/
(2^M-1)*(node.parent_upper_y-node.parent_lower_y);
float child_lower_z = node.parent_lower.z + node.child_lower_z[i]/
(2^M-1)*(node.parent_upper_z-node.parent_lower_z);

Table 2 illustrates a calculation of a floating point value for the lower bounds of a child bounding box based on floating point value for the extents of the parent pounding box and a fixed point value of a child bounding box that is stored as an offset from an extent of the parent bounding box. The child upper bounds may be computed in an analogous manner.

In one embodiment the performance of the decompression can be improved by storing the scaled parent bounding box sizes, e.g., (parent_upper_x-parent_lower_x)/(2^M−1) instead of the parent_upper_x/y/z values. In such embodiment, a child bounding box extent can be computed according to the example logic shown in Table 3.

TABLE 3

Enhanced Child Node Decompression for a BVH Node float child_lower_x = node.parent_lower.x +
node.child_lower_x[i]*node.scaled_parent_size_x;
float child_lower_y = node.parent_lower.y +
node.child_lower_y[i]*node.scaled_parent_size_y;
float child_lower_z = node.parent_lower.z +
node.child_lower_z[i]*node.scaled_parent_size_z;

Note that in the optimized version the decompression/dequantization can be formulated as a MAD-instruction (multiply-and-add) where hardware support exists for such instruction. In one embodiment, the operations for each child node can be performed using SIMD/vector logic, enabling the simultaneous evaluation of each child within the node.

While the approach described above approach works well for a shader or CPU based implementation, one embodiment provides specialized hardware that is configured to perform ray-tracing operations including ray-box intersection tests using a bounding volume hierarchy. In such embodiment the specialized hardware can be configured to store a further quantized representation of the BVH node data and de-quantize such data automatically when performing a ray-box intersection test.

FIG. 19 is a block diagram of a composite floating point data block 1900 for use by a quantized BVH node 1910 according to a further embodiment. In one embodiment, in contrast with a 32-bit single precision floating point representation or a 64-bit double precision floating point representation of the extents of the parent bounding box, logic to support a composite floating point data block 1900 can be defined by specialized logic within a graphics processor. The composite floating point (CFP) data block 1900 can include a 1-bit sign bit 1902, a variable sized (E-bit) signed integer exponent 1904 and a variable sized (K-bit) mantissa 1906. Multiple values for E and K may be configurable by adjusting values stored in configuration registers of the graphics processor. In one embodiment, the values for E and K may be independently configured within a range of values. In one embodiment a fixed set of interrelated values for E and K may be selected from via the configuration registers. In one embodiment, a single value each for E and K is hard coded into BVH logic of the graphics processor. The values E and K enable the CFP data block 1900 to be used as a customized (e.g., special purpose) floating point data type that can be tailored to the data set.

Using the CFP data block 1900, the graphics processor can be configured to store bounding box data in the quantized BVH node 1910. In one embodiment the lower bounds of the parent bounding box (parent_lower_x 1912, parent lower_y 1914, parent_lower_z 1916) are stored at a level of precision determined by the E and K values selected for the CFP data block 1900. The level of precision of the storage values for the lower bound of the parent bounding box will generally be set to a higher precision than the values of the child bounding box (child_lower_x 1924, child_upper_x 1926, child_lower_y 1934, child_upper_y 1936, child_lower_z 1944, child_upper_z 1946), which will be stored as fixed point values. A scaled parent bounding box size is stored as a power of 2 exponent (e.g., exp_x 1922, exp_y 1932, exp_z 1942). Additionally, a reference for each child (e.g., child reference 1952) can be stored. The size of the quantized BVH node 1910 can scale based on the width (e.g., number of children) stored in each node, with amount of storage used to store the child references and the bounding box values for the child nodes increasing with each additional node.

Logic for an implementation of the quantized BVH node of FIG. 19 is shown in Table 4 below.

TABLE 4

Quantized N-wide BVH Node for Hardware Implementation.
struct QuantizedNodeHW

{
   struct Float { int1 sign; intE exp; uintK mantissa; };
   Float parent_lower_x, parent_lower_y, parent_lower_z;
   intE exp_x; uintM child_lower_x[N], child_upper_x[N];
   intE exp_y; uintM child_lower_y[N], child_upper_y[N];
   intE exp_z; uintM child_lower_z[N], child_upper_z[N];
   Reference child [N];
};

As shown in Table 4, a composite floating point data block (e.g., struct Float) can be defined to represent values for the parent bounding box. The Float structure includes a 1-bit sign (int1 sign), an E-bit signed integer to store power of 2 exponents (intE exp), and a K-bit unsigned integer (uintK mantissa) to represent the mantissa used to store the high accuracy bounds. For the child bounding box data, M-bit unsigned integers (uintM child_lower_x/y/z; uintM child_upper_x/y/z) can be used to store fixed point numbers to encode the relative child bounds.

For the example of E=8, K=16, M=8, and using 32 bits for the child references, the QuantizedNodeHW structure of Table 4 has a size of 52 bytes for a 4-wide BVH and a size of 92 bytes for a 8-wide BVH, which is a reduction in the structure size relative to the quantized node of Table 1 and a significant reduction in structure size relative to existing implementations. It will be noted that for the mantissa value (K=16) one bit of the mantissa may be implied, reducing the storage requirement to 15 bits.

The layout of the BVH node structure of Table 4 enables reduced hardware to perform ray-box intersection tests for the child bounding boxes. The hardware complexity is reduced based on several factors. A lower number of bits for K can be chosen, as the relative child bounds add additional M bits of accuracy. The scaled parent bounding box size is stored as a power of 2 (exp_x/y/z fields), which simplify the calculations. Additionally, the calculations are refactored to reduce the size of multipliers.

In one embodiment, ray intersection logic of the graphics processor calculates the hit distances of a ray to axis-aligned planes to perform a ray-box testing. The ray intersection logic can use BVH node logic including support for the quantized node structure of Table 4. The logic can calculate the distances to the lower bounds of the parent bounding box using the higher precision parent lower bounds and the quantized relative extents of the child boxes. Exemplary logic for x plane calculations is shown in Table 5 below.

TABLE 5

Ray-Box Intersection Distance Determination

```
float dist_parent_lower_x = node.parent_lower_x *
rcp_ray_dir_x -
ray_org_mul_rcp_ray_dir_x;
float dist_child_lower_x = dist_parent_lower_x +
rcp_ray_dir_x*node.child_lower_x[i]*2^node.exp_x;
float dist_child_upper_x = dist_parent_lower_x +
rcp_ray_dir_x*node.child_upper_x[i]*2^node.exp_x;
```

With respect to the logic of Table 5, if a single precision floating point accuracy is assumed to represent the ray, then a 23-bit times a 15-bit multiplier can be used, as the parent_lower_x value is stored with 15 bits of mantissa. The distance to the lower bounds of the parent bounding box on the y and z planes can be calculated in a manner analogous to the calculation for dist_parent_lower_x.

Using the parent lower bounds, the intersection distances to the relative child bounding boxes can be calculated for each child bounding box, as exemplified by the calculation for dist_child_lower_x and dist_child_upper_x as in Table 5. The calculation of the dist_child_lower/upper_x/y/z values can be performed using a 23-bit times 8-bit multiplier.

Figure 20:
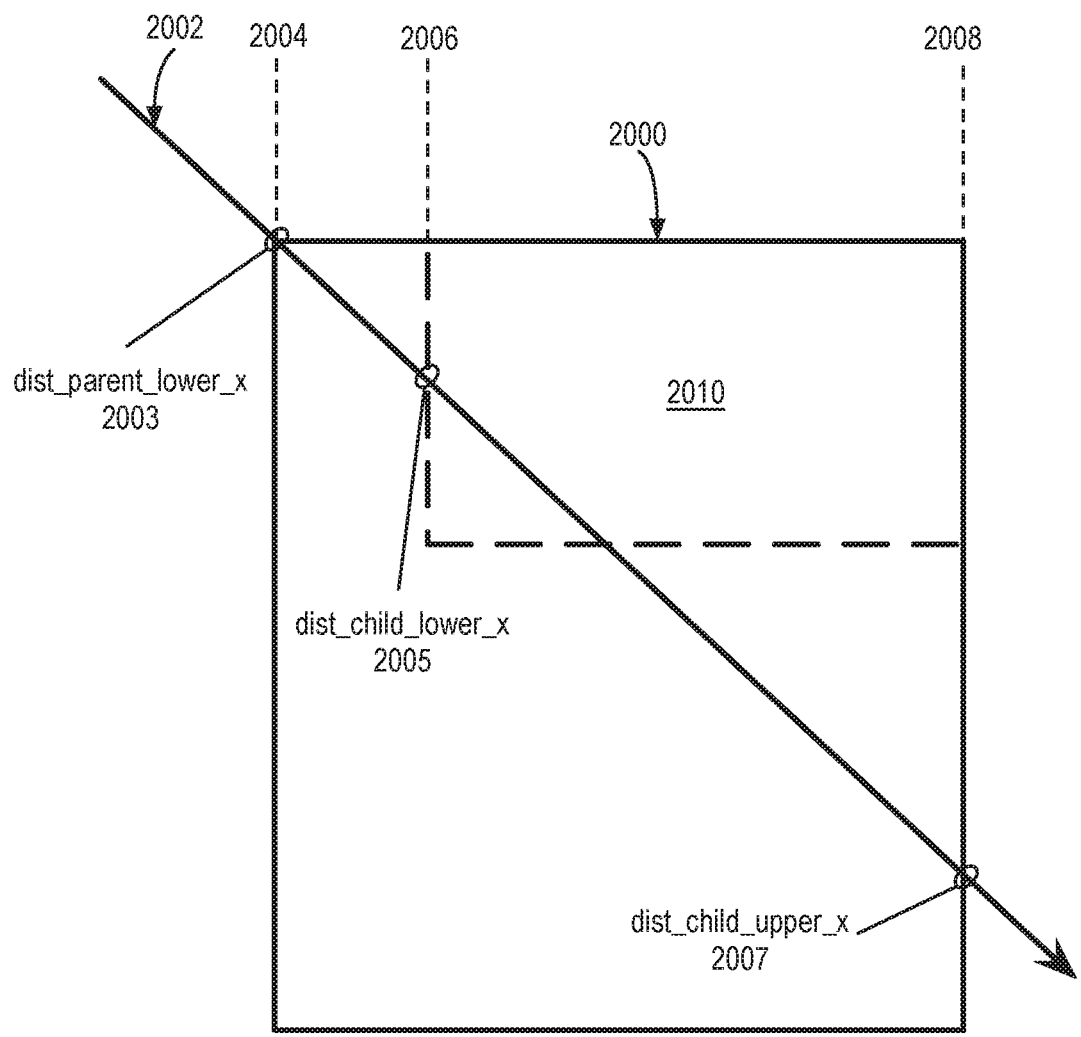
FIG. 20 illustrates ray-box intersection using quantized values to define a child bounding box relative to a parent bounding box, according to an embodiment.

FIG. 20 illustrates ray-box intersection using quantized values to define a child bounding box 2010 relative to a parent bounding box 2000, according to an embodiment. Applying the ray-box intersection distance determination equations for the x plane shown in Table 5, a distance along a ray 2002 at which the ray intersects the bound of the parent bounding box 2000 along the x plane can be determined. The position dist_parent_lower_x 2003 can be determined in which the ray 2002 crosses the lower bounding plane 2004 of the parent bounding box 2000. Based on the dist_parent_lower_x 2003, a dist_child_lower_x 2005 can be determined where the ray intersects the minimum bounding plane 2006 of the child bounding box 2010. Additionally, based on the dist_parent_lower_x 2003, a dist_child_upper_x 2007 can be determined for a position in which the ray intersects the maximum bounding plane 2008 of the child bounding box 2010. A similar determination can be performed for each dimension in which the parent bounding box 2000 and the child bounding box 2010 are defined (e.g., along the y and z axis). The plane intersection distances can then be used to determine whether the ray intersects the child bounding box. In one embodiment, the graphics processing logic can determine intersection distances for multiple dimensions and multiple bounding boxes in a parallel manner using SIMD and/or vector logic. Additionally, at least a first portion of the calculations described herein may be performed on a graphics processor while a second portion of the calculations may be performed on one or more application processors coupled to the graphics processor.

Figure 21:
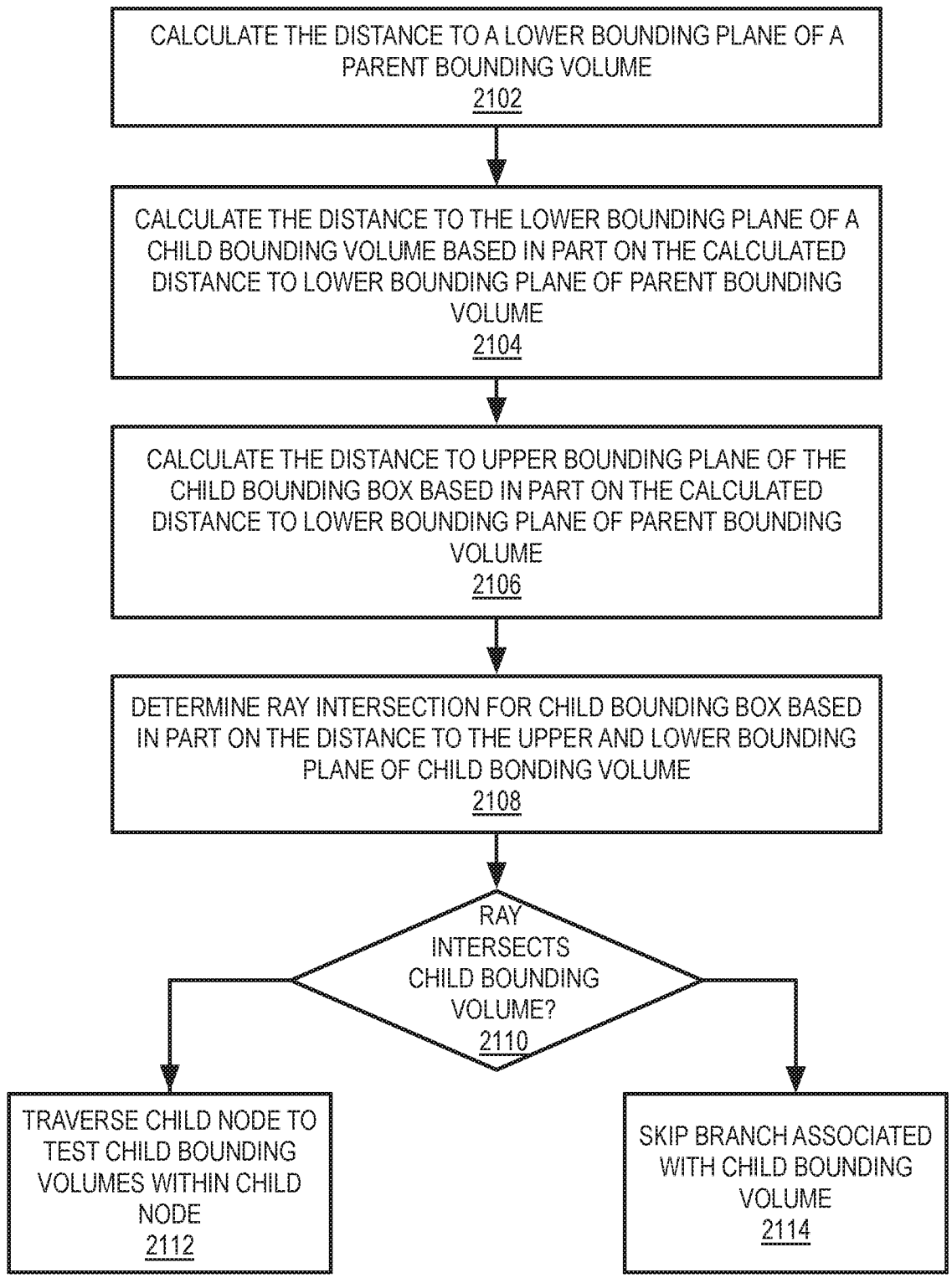
FIG. 21 is a flow diagram of BVH decompression and traversal logic, according to an embodiment.

FIG. 21 is a flow diagram of BVH decompression and traversal logic 2100, according to an embodiment. In one embodiment the BVH decompression and traversal logic resides in special purpose hardware logic of a graphics processor, or may be performed by shader logic executed on execution resources of the graphics processor. The BVH decompression and traversal logic 2100 can cause the graphics processor to perform operations to calculate the distance along a ray to the lower bounding plane of a parent bounding volume, as shown at block 2102. At block 2104, the logic can calculate the distance to the lower bounding plane of a child bounding volume based in part on the calculated distance to the lower bounding plane of the parent bounding volume. At block 2106, the logic can calculate the distance to the upper bounding plane of a child bounding volume based in part on the calculated distance to the lower bounding plane of the parent bounding volume.

At block 2108, the BVH decompression and traversal logic 2100 can determine ray intersection for the child bounding volume based in part on the distance to the upper and lower bounding plane of the child bounding volume, although intersection distances for each dimension of the bounding box will be used to determine intersection. In one embodiment the BVH decompression and traversal logic 2100 determines ray intersection for the child bounding volume by determining whether the largest entry plane intersection distance for the ray is smaller than or equal to the smallest exit plane distance. In other words, the ray intersects the child bounding volume when the ray enters the bounding volume along all defined planes before exiting the bounding volume along any of the defined planes. If at 2110 the BVH decompression and traversal logic 2100 determines that the ray intersects the child bounding volume, the logic can traverse the child node for the bounding volume to test the child bounding volumes within the child node, as shown at block 2112. At block 2112 a node traversal can be performed in which the reference to node associated with the intersected bounding box can be accessed. The child bounding volume can become the parent bounding volume and the children of the intersected bounding volume can be evaluated. If at 2110 the BVH decompression and traversal logic 2100 determines that the ray does not intersect the child bounding volume, the branch of the bounding hierarchy associated with the child bounding volume is skipped, as shown at block 2114, as the ray will not intersect any bounding volumes further down the sub-tree branch associated with a child bounding volume that is not intersected.

Further Compression Via Shared Plane Bounding Boxes

For any N-wide BVH using bounding boxes, the bounding volume hierarchy can be constructed such that each of the six sides of a 3D bounding box is shared by at least one child bounding box. In a 3D shared plane bounding box, $6 \times \log_2 N$ bits can be used to indicate whether a given plane of a parent bounding box is shared with a child bounding box. With N=4 for a 3D shared plane bounding box, 12-bits would be used to indicate shared planes, where each of two bits are used to identify which of the four children reuse each potentially shared parent plane. Each bit can be used to indicate whether a parent plane is re-used by a specific child. In the event of a 2-wide BVH, 6 additional bits can be added to indicate, for each plane of a parent bounding box, whether the plane (e.g., side) of the bounding box is shared by a child. Although the SPBB concepts can apply to an arbitrary number of dimensions, in one embodiment the benefits of the SPBB are generally the highest for a 2-wide (e.g., binary) SPBB.

The use of the shared plane bounding box can further reduce the amount of data stored when using BVH node quantization as described herein. In the example of the 3D, 2-wide BVH, the six shard plane bits can refer to min_x, max_x, min_y, max_y, min_z, and max_z for the parent bounding box. If min_x bit is zero, the first child inherits the shared plane from the parent bounding box. For each child that shares a plane with the parent bounding box, quantized values for that plane need not be stored, which reduces the storage costs and the decompression costs for the node. Additionally, the higher precision value for the plane can be used for the child bounding box.

Figure 22:
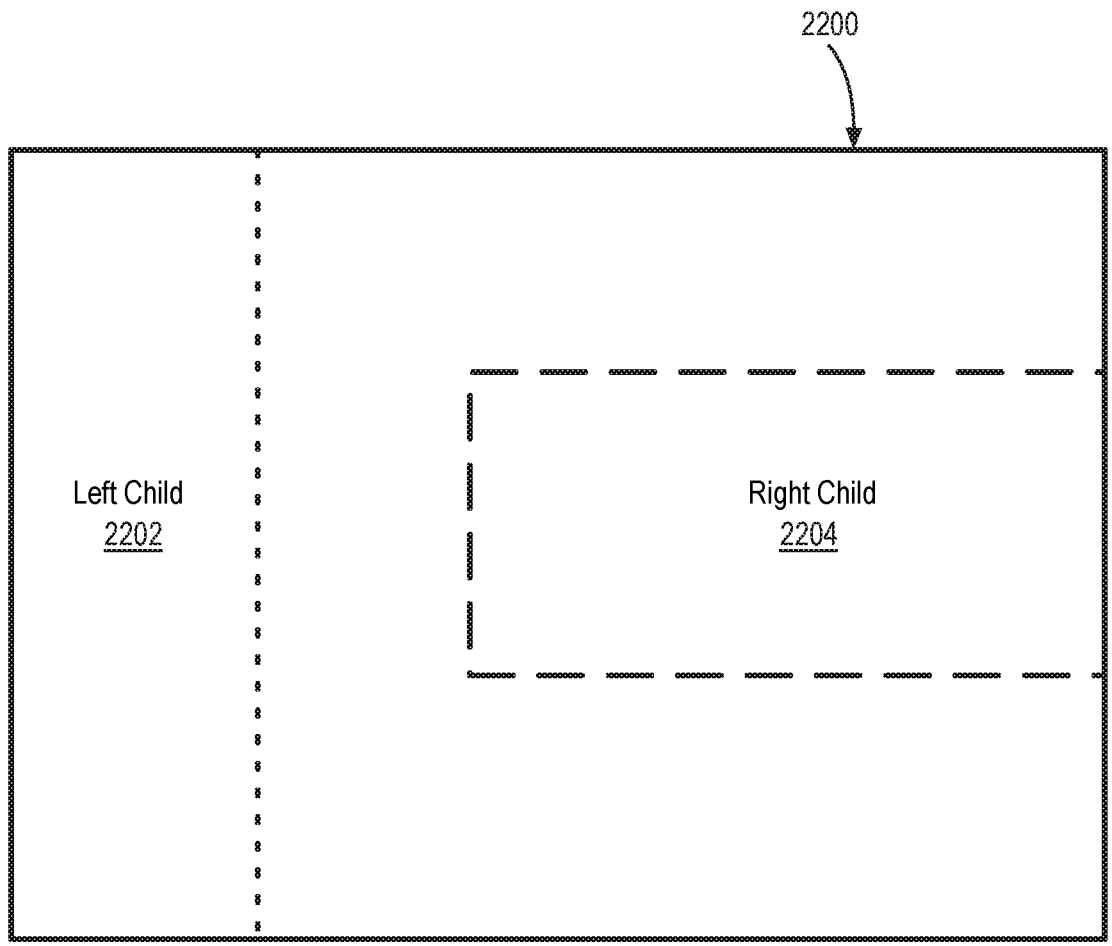
FIG. 22 is an illustration of an exemplary two-dimensional shared plane bounding box.

FIG. 22 is an illustration of an exemplary two-dimensional shared plane bounding box 2200. The two-dimensional (2D) shared plane bounding box (SPBB) 2200 includes a left child 2202 and a right child 2204. For a 2D binary SPBPP, 4 $\log_2$ 2 additional bits can be used to indicate which of the four shared planes of the parent bounding box are shared, where a bit is a associated with each plane. In one embodiment, a zero can be associated with the left child 2202 and a one can be associated with the right child, such that the shared plane bits for the SPBB 2200 are min_x=0; max_x=1; min_y=0; max_y=0, as the left child 2202 shares the lower_x, upper_y, and lower_y planes with the parent SPBB 2200 and the right child 2204 shares the upper_x plane.

Figure 23:
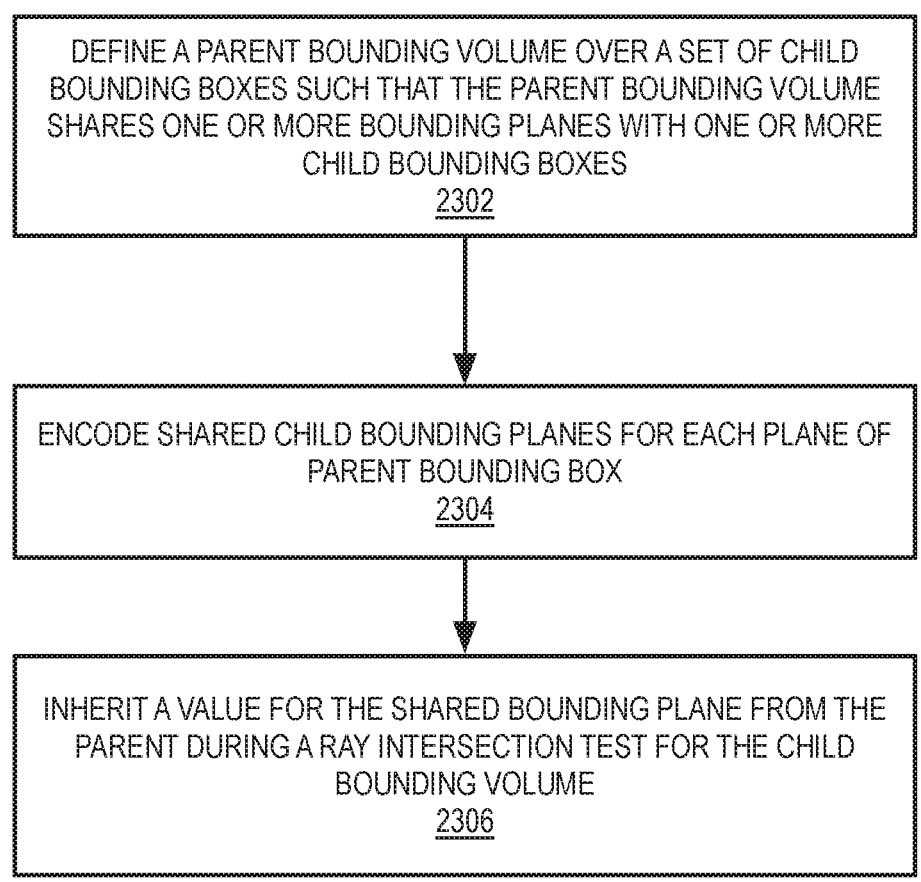
FIG. 23 is a flow diagram of shared plane BVH logic, according to an embodiment.

FIG. 23 is a flow diagram of shared plane BVH logic 2300, according to an embodiment. The shared plane BVH logic 2300 can be used to reduce the number of quantized values stored for the lower and upper extents of one or more child bounding boxes, reduce the decompression/dequantization costs for a BVH node, and enhance the precision of the values used for ray-box intersection tests for child bounding boxes of a BVH node. In one embodiment the shared plane BVH logic 2300 includes to define a parent bounding box over a set of child bounding boxes such that the parent bounding box shares one or more planes with one or more child bounding boxes, as shown at block 2302. The parent bounding box can be defined, in one embodiment, by selecting a set of existing axis aligned bounding boxes for geometric objects in a scene and defining a parent bounding box based on the minimum and maximum extent of the set of bounding boxes in each plane. For example, the upper plane value for each plane of the parent bounding box is defined as the maximum value for each plane within the set of child bounding boxes. At block 2304, the shared plane BVH logic 2300 can encode shared child planes for each plane of the parent bounding box. As shown at block 2306, the shared plane BVH logic 2300 can inherit a parent plane value for a child plane having a shared plane during a ray-box intersection test. The shared plane value for the child can be inherited at the higher precision in which the parent plane values are stored in the BVH node structure and generating and storing the lower precision quantized value for the shared plane can be bypassed.

Figure 24:
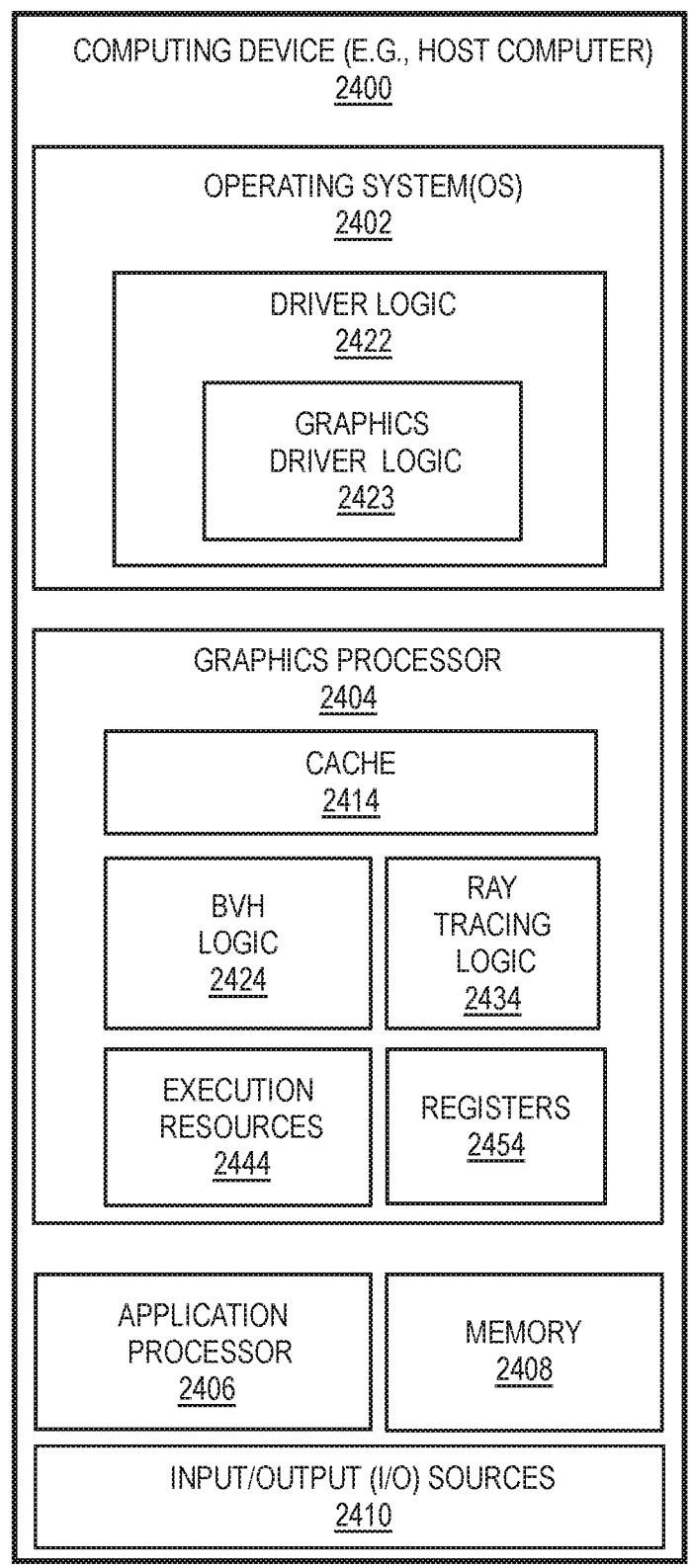
FIG. 24 is a block diagram of a computing device including a graphics processor having bounding volume hierarchy logic, according to an embodiment.

FIG. 24 is a block diagram of a computing device 2400 including a graphics processor 2404 having bounding volume hierarchy logic 2424, according to an embodiment. The computing device 2400 can be a computing device such as the data processing system 100 as in of FIG. 1. The computing device 2400 may also be or be included within a communication device such as a set-top box (e.g., Internet-based cable television set-top boxes, etc.), global positioning system (GPS)-based devices, etc. The computing device 2400 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2400 includes a mobile computing device employing an integrated circuit ("IC"), such as system on a chip ("SoC" or "SOC"), integrating various hardware and/or software components of computing device 2400 on a single chip.

In one embodiment the bounding volume hierarchy (BVH) logic 2424 includes logic to encode a compressed representation of a bounding volume hierarchy and additional logic to decode and interpret the compressed representation of the bounding volume hierarchy. The BVH logic 2424 can work on concert with ray tracing logic 2434 to perform hardware accelerated ray-box intersection tests. In one embodiment the BVH logic 2424 is configured to encode multiple child bounding volumes relative to a reference bounding volume. For example, the BVH logic 2424 can encode the reference bounding volume and child bounding volumes using upper and lower bounds in multiple directions, where the reference bounding volume is encoded using floating point values and the child bounding volume is encoded using fixed point values. The BVH logic 2424 can be configured to encode the reference bounding volume as lower bounds and scaled extents of the bounds and the child bounding volumes using lower and upper bounds in multiple directions. In one embodiment the BVH logic 2424 is configured to use the encoded multiple child bounding volumes to encode nodes of a bounding volume hierarchy.

The ray tracing logic 2434 can operate at least in part in connection with execution resources 2444 of the graphics processor 2404 include execution units and associated logic, such as the logic within a graphics core 580A-N of FIG. 5 and/or the execution logic 600 illustrated in FIG. 6. The ray tracing logic 2434 can perform ray traversal through the bounding volume hierarchy and test if a ray intersects the encoded child bounding volumes of a node. The ray tracing logic 2434 can be configured to calculate bounding plane distances to test for ray bounding volume intersection by calculating distances to the planes of the lower reference bounding planes and adding to the distances the arithmetic product of the reciprocal ray direction, the scaled extents of the reference bounds, and the relative child bounding plane location, to calculate the distances to all child bounding planes.

In one embodiment a set of registers 2454 can also be included to store configuration and operational data for components of the graphics processor 2404. The graphics processor 2404 can additionally include a memory device configured as a cache 2414. In one embodiment the cache 2414 is a render cache for performing rendering operations. In one embodiment, the cache 2414 can also include an additional level of the memory hierarchy, such as a last level cache stored in the embedded memory module 218 of FIG. 2.

As illustrated, in one embodiment, in addition to a graphics processor 2404, the computing device 2400 may further include any number and type of hardware components and/or software components, such as (but not limited to) an application processor 2406, memory 2408, and input/output (I/O) sources 2410. The application processor 2406 can interact with a hardware graphics pipeline, as illustrated with reference to FIG. 3, to share graphics pipeline functionality. Processed data is stored in a buffer in the hardware graphics pipeline, and state information is stored in memory 2408. The resulting image is then transferred to a display controller for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 2406 can include one or more processors, such as processor(s) 102 of FIG. 1, and may be the central processing unit (CPU) that is used at least in part to execute an operating system (OS) 2402 for the computing device 2400. The OS 2402 can serve as an interface between hardware and/or physical resources of the computer device 2400 and a user. The OS 2402 can include driver logic 2422 for various hardware devices in the computing device 2400. The driver logic 2422 can include graphics driver logic 2423 such as the user mode graphics driver 1026 and/or kernel mode graphics driver 1029 of FIG. 10. In one embodiment the graphics driver logic 2423 can be used to configure the BVH logic 2424 and ray tracing logic 2434 of the graphics processor 2404.

It is contemplated that in some embodiments, the graphics processor 2404 may exist as part of the application processor 2406 (such as part of a physical CPU package) in which case, at least a portion of the memory 2408 may be shared by the application processor 2406 and graphics processor 2404, although at least a portion of the memory 2408 may be exclusive to the graphics processor 2404, or the graphics processor 2404 may have a separate store of memory. The memory 2408 may comprise a pre-allocated region of a buffer (e.g., framebuffer); however, it should be understood by one of ordinary skill in the art that the embodiments are not so limited, and that any memory accessible to the lower graphics pipeline may be used. The memory 2408 may include various forms of random access memory (RAM) (e.g., SDRAM, SRAM, etc.) comprising an application that makes use of the graphics processor 2404 to render a desktop or 3D graphics scene. A memory controller hub, such as memory controller hub 116 of FIG. 1, may access data in the memory 2408 and forward it to graphics processor 2404 for graphics pipeline processing. The memory 2408 may be made available to other components within the computing device 2400. For example, any data (e.g., input graphics data) received from various I/O sources 2410 of the computing device 2400 can be temporarily queued into memory 2408 prior to their being operated upon by one or more processor(s) (e.g., application processor 2406) in the implementation of a software program or application. Similarly, data that a software program determines should be sent from the computing device 2400 to an outside entity through one of the computing system interfaces, or stored into an internal storage element, is often temporarily queued in memory 2408 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2010 may include one or more I/O devices that are implemented for transferring data to and/or from the computing device 2400 (e.g., a networking adapter); or, for a large-scale non-volatile storage within the computing device 2400 (e.g., hard disk drive). User input devices, including alphanumeric and other keys, may be used to communicate information and command selections to graphics processor 2404. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2400 may be employed to observe gestures, record audio and video and to receive and transmit visual and audio commands.

I/O sources 2410 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface (s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/ or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2400 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Apparatus and Method for Compressing Leaf
Nodes of Bounding Volume Hierarchies

The downside of acceleration structures such as bounding volume hierarchies (BVHs) and k-d trees is that they require both time and memory to be built and stored. One way to reduce this overhead is to employ some sort of compression and/or quantization of the acceleration data structure, which works particularly well for BVHs, which naturally lend to conservative, incremental encoding. On the upside, this can significantly reduce the size of the acceleration structure often halving the size of BVH nodes. On the downside, compressing the BVH nodes also incurs overhead, which may fall into different categories. First, there is the obvious cost of decompressing each BVH node during traversal; second, in particular for hierarchical encoding schemes the need to track parent information slightly complicates the stack operations; and third, conservatively quantizing the bounds means that the bounding boxes are somewhat less tight than uncompressed ones, triggering a measurable increase in the number of nodes and primitives that have to be traversed and intersected, respectively.

Compressing the BVH by local quantization is a known method to reduce its size. An n-wide BVH node contains the axis-aligned bounding boxes (AABBs) of its "n" children in single precision floating point format. Local quantization expresses the "n" children AABBs relative to the AABB of the parent and stores these value in quantized e.g. 8 bit format, thereby reducing the size of BVH node.

Local quantization of the entire BVH introduces multiple overhead factors as (a) the de-quantized AABBs are coarser than the original single precision floating point AABBs, thereby introducing additional traversal and intersection steps for each ray and (b) the de-quantization operation itself is costly which adds and overhead to each ray traversal step. Because of these disadvantages, compressed BVHs are only used in specific application scenarios and not widely adopted.

One embodiment of the invention employs techniques to compress leaf nodes for hair primitives in a bounding-volume hierarchy. In particular, in one embodiment, several groups of oriented primitives are stored together with a parent bounding box, eliminating child pointer storage in the leaf node. An oriented bounding box is then stored for each primitive using 16-bit coordinates that are quantized with respect to a corner of the parent box. Finally, a quantized normal is stored for each primitive group to indicate the orientation. This approach may lead to a significant reduction in the bandwidth and memory footprint for BVH hair primitives.

In some embodiments, BVH nodes are compressed (e.g. for an 8-wide BVH) by storing the parent bounding box and encoding N child bounding boxes (e.g., 8 children) relative to that parent bounding box using less precision. A disadvantage of applying this idea to each node of a BVH is that at every node some decompression overhead is introduced when traversing rays through this structure, which may reduce performance.

To address this issue, one embodiment of the invention uses the compressed nodes only at the lowest level of the BVH. This provides an advantage of the higher BVH levels running at optimal performance (i.e., they are touched as often as boxes are large, but there are very few of them), and compression on the lower/lowest levels is also very effective, as most data of the BVH is in the lowest level(s).

In addition, in one embodiment, quantization is also applied for BVH nodes that store oriented bounding boxes. As discussed below, the operations are somewhat more complicated than for axis-aligned bounding boxes. In one implementation, the use of compressed BVH nodes with oriented bounding boxes is combined with using the compressed nodes only at the lowest level (or lower levels) of the BVH.

Thus, one embodiment improves upon fully-compressed BVHs by introducing a single, dedicated layer of compressed leaf nodes, while using regular, uncompressed BVH nodes for interior nodes. One motivation behind this approach is that almost all of the savings of compression comes from the lowest levels of a BVH (which in particular for 4-wide and 8-wide BVHs make up for the vast majority of all nodes), while most of the overhead comes from interior nodes. Consequently, introducing a single layer of dedicated "compressed leaf nodes" gives almost the same (and in some cases, even better) compression gains as a fully-compressed BVH, while maintaining nearly the same traversal performance as an uncompressed one.

Figure 25:
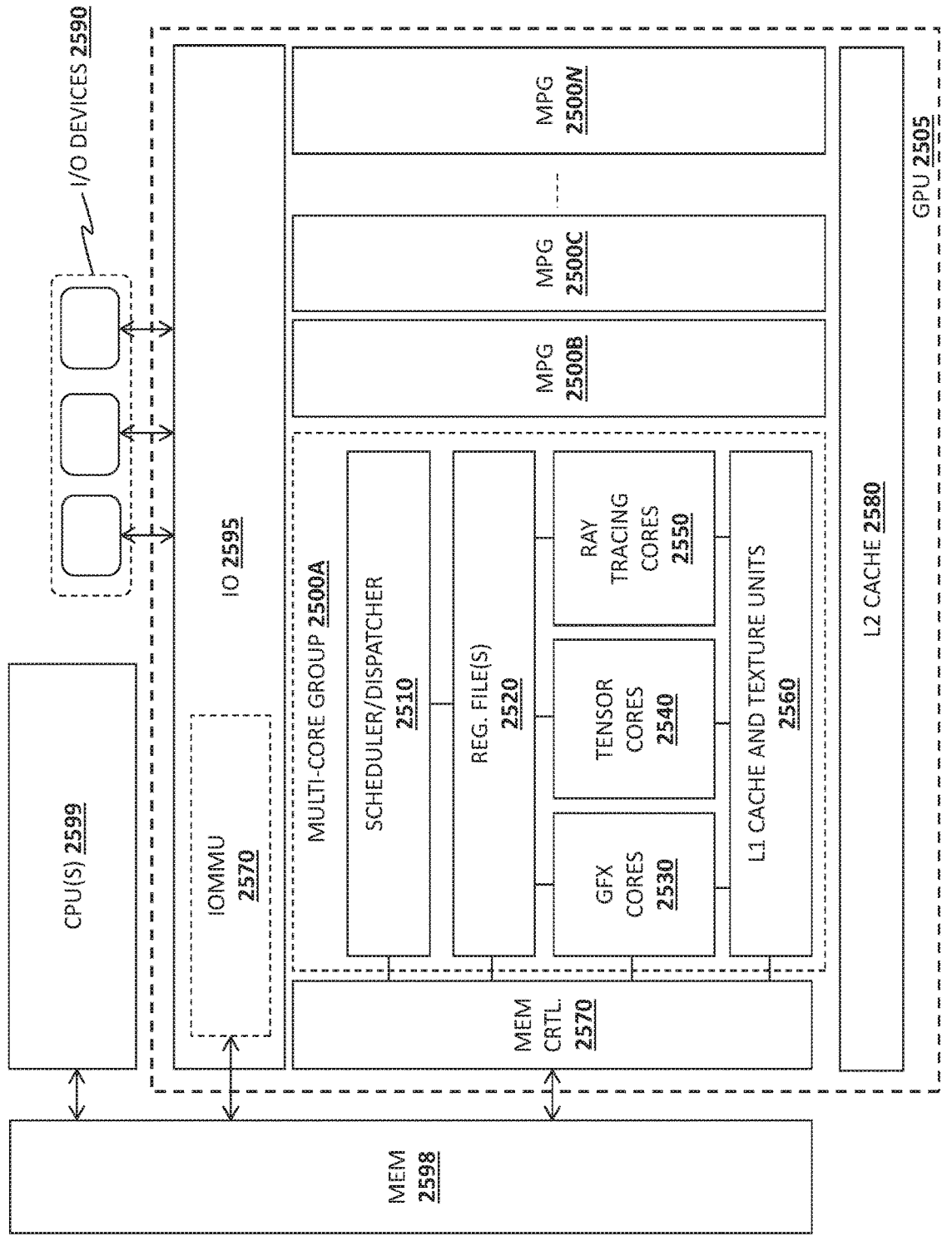
FIG. 25 illustrates an apparatus or system on which embodiments of the invention may be implemented.

In one embodiment, the techniques described herein are integrated within the traversal/intersection circuitry within a graphics processor such as the GPU 2505 illustrated in FIG. 25 which includes dedicated sets of graphics processing resources arranged into multi-core groups 2500A-N. While the details of only a single multi-core group 2500A are provided, it will be appreciated that the other multi-core groups 2500B-N may be equipped with the same or similar sets of graphics processing resources.

As illustrated, a multi-core group 2500A may include a set of graphics cores 2530, a set of tensor cores 2540, and a set of ray tracing cores 2550. A scheduler/dispatcher 2510 schedules and dispatches the graphics threads for execution on the various cores 2530, 2540, 2550. A set of register files 2520 store operand values used by the cores 2530, 2540, 2550 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more Level 1 caches and texture units 2560 store graphics data such as texture data, vertex data, pixel data, ray data, bounding volume data, etc, locally within each multi-core group 2500A. A Level 2 (L2) cache 2580 shared by all or a subset of the multi-core groups 2500A-N stores graphics data and/or instructions for multiple concurrent graphics threads. One or more memory controllers 2570 couple the GPU 2505 to a memory 2598 which may be a system memory (e.g., DRAM) and/or a dedicated graphics memory (e.g., GDDR6 memory).

Input/output (IO) circuitry 2595 couples the GPU 2505 to one or more IO devices 2595 such as digital signal processors (DSPs), network controllers, or user input devices. An on-chip interconnect may be used to couple the I/O devices 2590 to the GPU 2505 and memory 2598. One or more IO memory management units (IOMMUs) 2570 of the IO circuitry 2595 couple the IO devices 2590 directly to the system memory 2598. In one embodiment, the IOMMU 2570 manages multiple sets of page tables to map virtual addresses to physical addresses in system memory 2598. In this embodiment, the IO devices 2590, CPU(s) 2599, and GPU(s) 2505 may share the same virtual address space.

In one implementation, the IOMMU 2570 supports virtualization. In this case, it may use a first set of page tables to map guest/graphics virtual addresses to guest/graphics physical addresses and a second set of page tables to map the guest/graphics physical addresses to system/host physical addresses (e.g., within system memory 2598).

In one embodiment, the CPUs 2599, GPUs 2505, and IO devices 2590 are integrated on a single semiconductor chip and/or chip package. The illustrated memory 2598 may be integrated on the same chip or may be coupled to the memory controllers 2570 via an off-chip interface. In one implementation, the memory 2598 comprises GDDR6 memory which shares the same virtual address space as other physical system-level memories, although the underlying principles of the invention are not limited to this specific implementation.

In one embodiment, the tensor cores 2540 include a plurality of execution units specifically designed to perform matrix operations, which are the fundamental compute operation used to perform deep learning operations. For example, simultaneous matrix multiplication operations may be used for neural network training and inferencing. The tensor cores 2540 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In one embodiment, the ray tracing cores 2550 accelerate ray tracing operations for both real-time ray tracing and non-real-time ray tracing implementations. For example, with respect to the embodiments of the invention, the ray tracing cores 2550 may include circuitry/logic for compressing leaf nodes of a BVH. In addition, the ray tracing cores 2550 may include ray traversal/intersection circuitry for performing ray traversal using the BVH and identifying intersections between rays and primitives enclosed within the BVH volumes. The ray tracing cores 2550 may also include circuitry for performing depth testing and culling (e.g., using a Z buffer or similar arrangement). Using dedicated ray tracing cores 2550 for traversal/intersection operations significantly reduces the load on the graphics cores 2530. Without these ray tracing cores 2550, the traversal and intersection operations would be implemented using shaders running on the graphics cores 2530 which would consume the bulk of the graphics processing resources of the GPU 2505, making real-time ray tracing impractical.

Figure 26:
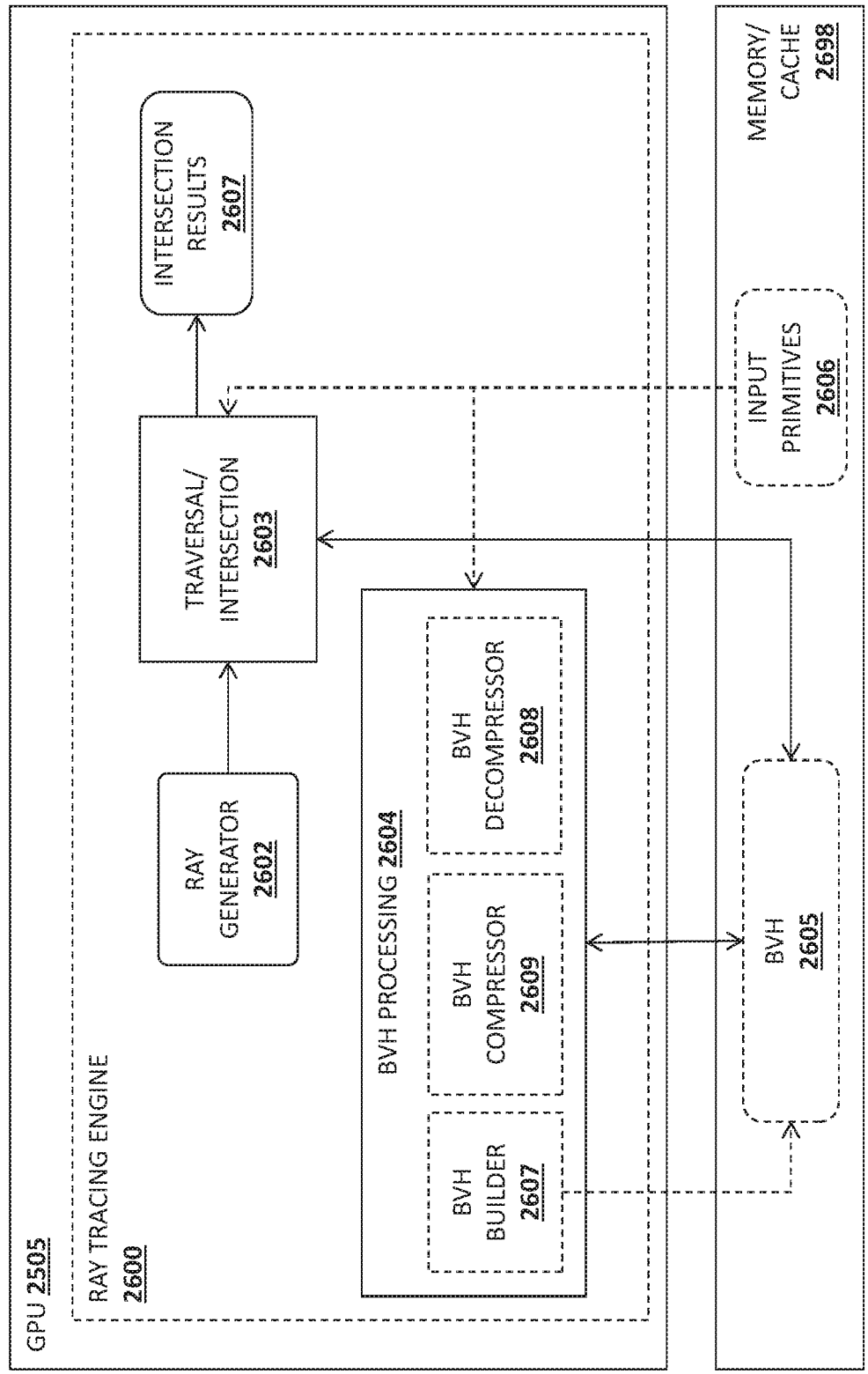
FIG. 26 illustrates one embodiment of an apparatus for building, compressing and decompressing nodes of a bounding volume hierarchy.

FIG. 26 illustrates an exemplary ray tracing engine 2600 which performs the leaf node compression and decompression operations described herein. In one embodiment, the ray tracing engine 2600 comprises circuitry of one or more of the ray tracing cores 2550 described above. Alternatively, the ray tracing engine 2600 may be implemented on the cores of the CPU 2599 or on other types of graphics cores (e.g., Gfx cores 2530, tensor cores 2540, etc).

In one embodiment, a ray generator 2602 generates rays which a traversal/intersection unit 2603 traces through a scene comprising a plurality of input primitives 2606. For example, an app such as a virtual reality game may generate streams of commands from which the input primitives 2606 are generated. The traversal/intersection unit 2603 traverses the rays through a BVH 2605 generated by a BVH builder 2607 and identifies hit points where the rays intersect one or more of the primitives 2606. Although illustrated as a single unit, the traversal/intersection unit 2603 may comprise a traversal unit coupled to a distinct intersection unit. These units may be implemented in circuitry, software/commands executed by the GPU or CPU, or any combination thereof.

Node Compression/Decompression

In one embodiment, BVH processing circuitry/logic 2604 includes a BVH builder 2607 which generates the BVH 2605 as described herein, based on the spatial relationships between primitives 2606 in the scene. In addition, the BVH processing circuitry/logic 2604 includes BVH compressor 2609 and a BVH decompressor 2609 for compressing and decompressing the leaf nodes, respectively, as described herein. The following description will focus on 8-wide BVHs (BVH8) for the purpose of illustration.

Figure 27:
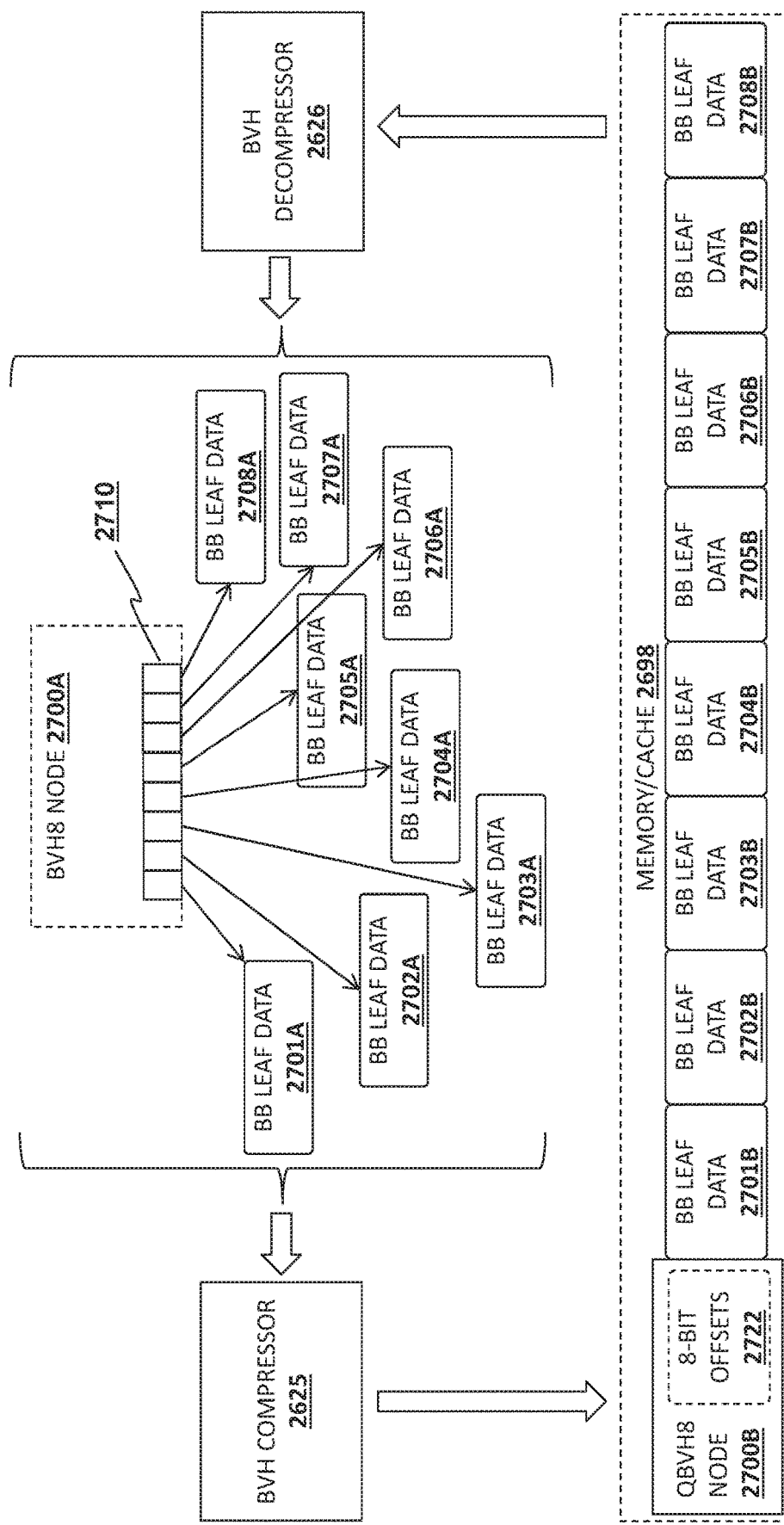
FIG. 27 one embodiment in which leaf nodes are compressed by replacing pointers with offsets.

As illustrated in FIG. 27, one embodiment of a single 8-wide BVH node 2700A contains 8 bounding boxes 2701-2708 and 8 (64 bit) child pointers/references 2710 pointing to the bounding boxes/leaf data 2701-2708. In one embodiment, BVH compressor 2625 performs an encoding in which the 8 child bounding boxes 2701A-2708A are expressed relative to the parent bounding box 2700A, and quantized to 8-bit uniform values, shown as bounding box leaf data 2701B-2708B. The quantized 8-wide BVH, QBVH8 node 2700B, is encoded by BVH compression 2625 using a start and extent value, stored as two 3-dimensional single precision vectors (2×12 bytes). The eight quantized child bounding boxes 2701B-2708B are stored as 2 times 8 bytes for the bounding boxes' lower and upper bounds per dimension (48 bytes total). Note this layout differs from existing implementations as the extent is stored in full precision, which in general provides tighter bounds but requires more space.

In one embodiment, BVH decompressor 2626 decompresses the QBVH8 node 2700B as follows. The decompressed lower bounds in dimension i can be computed by QBVH8.starti+(bytetofloat) QBVH8.loweri*QBVH8.extendi, which on the CPU 4099 requires five instructions per dimension and box: 2 loads (start,extend), byte-to-int load+upconversion, int-to-float conversion, and one multiply-add. In one embodiment, the decompression is done for all 8 quantized child bounding boxes 2701B-2708B in parallel using SIMD instructions, which adds an overhead of around 10 instructions to the ray-node intersection test, making it at least more than twice as expensive than in the standard uncompressed node case. In one embodiment, these instructions are executed on the cores of the CPU 2599. Alternatively, the comparable set of instructions are executed by the ray tracing cores 2550.

Without pointers, a QBVH8 node requires 72 bytes while an uncompressed BVH8 node requires 192 bytes, which results in reduction factor of 2.66×. With 8 (64 bit) pointers the reduction factor reduces to 1.88×, which makes it necessary to address the storage costs for handling leaf pointers.

Leaf-Level Compression & Layout

In one embodiment, when compressing only the leaf layer of the BVH8 nodes into QBVH8 nodes, all children pointers of the 8 children 2701-2708 will only refer to leaf primitive data. In one implementation, this fact is exploited by storing all referenced primitive data directly after the QBVH8 node 2700B itself, as illustrated in FIG. 27. This allows for reducing the QBVH8's full 64 bit child pointers 2710 to just 8-bit offsets 2722. In one embodiment, if the primitive data is a fixed sized, the offsets 2722 are skipped completely as they can be directly computed from the index of the intersected bounding box and the pointer to the QBVH8 node 2700B itself.

BVH Builder Modifications

When using a top-down BVH8 builder, compressing just the BVH8 leaf-level requires only slight modifications to the build process. In one embodiment these build modifications are implemented in the BVH builder 2607. During the recursive build phase the BVH builder 2607 tracks whether the current number of primitives is below a certain threshold. In one implementation N×M is the threshold where N refers to the width of the BVH, and M is the number of primitives within a BVH leaf. For a BVH8 node and, for example, four triangles per leaf, the threshold is 32. Hence for all sub-trees with less than 32 primitives, the BVH processing circuitry/logic 2604 will enter a special code path, where it will continue the surface area heuristic (SAH)-based splitting process but creates a single QBVH8 node 2700B. When the QBVH8 node 2700B is finally created, the BVH compressor 2609 then gathers all referenced primitive data and copies it right behind the QBVH8 node.

Traversal

The actual BVH8 traversal performed by the ray tracing core 2550 or CPU 2599 is only slightly affected by the leaf-level compression. Essentially the leaf-level QBVH8 node 2700B is treated as an extended leaf type (e.g., it is marked as a leaf). This means the regular BVH8 top-down traversal continues until a QBVH node 2700B is reached. At this point, a single ray-QBVH node intersection is executed and for all of its intersected children 2701B-2708B, the respective leaf pointer is reconstructed and regular ray-primitive intersections are executed. Interestingly, ordering of the QBVH's intersected children 2701B-2708B based on intersection distance may not provide any measurable benefit as in the majority of cases only a single child is intersected by the ray anyway.

Leaf Data Compression

One embodiment of the leaf-level compression scheme allows even for lossless compression of the actual primitive leaf data by extracting common features. For example, triangles within a compressed-leaf BVH (CLBVH) node are very likely to share vertices/vertex indices and properties like the same objectID. By storing these shared properties only once per CLBVH node and using small local byte-sized indices in the primitives the memory consumption is reduced further.

In one embodiment, the techniques for leveraging common spatially-coherent geometric features within a BVH leaf are used for other more complex primitive types as well. Primitives such as hair segments are likely to share a common direction per-BVH leaf. In one embodiment, the BVH compressor 2609 implements a compression-scheme which takes this common direction property into account to efficiently compress oriented bounding boxes (OBBs) which have been shown to be very useful for bounding long diagonal primitive types.

The leaf-level compressed BVHs described herein introduce BVH node quantization only at the lowest BVH level and therefore allow for additional memory reduction optimizations while preserving the traversal performance of an uncompressed BVH. As only BVH nodes at the lowest level are quantized, all of its children point to leaf data 2701B-2708B which may be stored contiguously in a block of memory or one or more cache line(s) 2698.

The idea can also be applied to hierarchies that use oriented bounding boxes (OBB) which are typically used to speed up rendering of hair primitives. In order to illustrate one particular embodiment, the memory reductions in a typical case of a standard 8-wide BVH over triangles will be evaluated.

The layout of an 8-wide BVH node 2700 is represented in the following core sequence:

```
struct BVH8Node {
    float lowerX[8], upperX[8];
    // 8 x lower and upper bounds in the X dimension
    float lowerY[8], upperY[8];
    // 8 x lower and upper bounds in the Y dimension
    float lowerZ[8], upperZ[8];
    // 8 x lower and upper bounds in the Z dimension
    void *ptr[8];
    // 8 x 64bit pointers to the 8 child nodes or leaf data
};
``` and requires 276 bytes of memory. The layout of a standard 8-wide quantized Node may be defined as:

```
struct QBVH8Node {
    Vec3f start, scale;
    char lowerX[8], upperX[8];
    // 8 x byte quantized lower/upper bounds in the X dimension
    char lowerY[8], upperY[8];
    // 8 x byte quantized lower/upper bounds in the Y dimension
    char lowerZ[8], upperZ[8];
    // 8 x byte quantized lower/upper bounds in the Z dimension
    void *ptr[8];
    // 8 x 64bit pointers to the 8 child nodes or leaf data
};
``` and requires 136 bytes.

Because only quantized BVH nodes are used at the leaf level, all children pointers will actually point to leaf data 2701A-2708A. In one embodiment, by storing the quantized node 2700B and all leaf data 2701B-2708B its children point to in a single continuous block of memory 2698, the 8 child pointers in the quantized BVH node 2700B are removed. Saving the child pointers reduces the quantized node layout to:

```
struct QBVH8NodeLeaf {
    Vec3f start, scale;
    // start position, extend vector of the parent AABB
    char lowerX[8], upperX[8];
    // 8 x byte quantized lower and upper bounds in the
    X dimension
    char lowerY[8], upperY[8];
    // 8 x byte quantized lower and upper bounds in the
    Y dimension
    char lowerZ[8], upperZ[8];
    // 8 x byte quantized lower and upper bounds in the
    Z dimension
};
``` which requires just 72 bytes. Due to the continuous layout in the memory/cache 2698, the child pointer of the i-th child can now be simply computed by: childPtr(i)=addr (QBVH8NodeLeaf)+sizeof(QBVH8NodeLeaf)+i*sizeof (LeafDataType).

As the nodes at lowest level of the BVH makes up for more than half of the entire size of the BVH, the leaf-level only compression described herein provide a reduction to 0.5+0.5*72/256=0.64× of the original size.

In addition, the overhead of having coarser bounds and the cost of decompressing quantized BVH nodes itself only occurs at the BVH leaf level (in contrast to all levels when the entire BVH is quantized). Thus, the often quite significant traversal and intersection overhead due to coarser bounds (introduced by quantization) is largely avoided.

Another benefit of the embodiments of the invention is improved hardware and software prefetching efficiency. This results from the fact that all leaf data is stored in a relatively small continuous block of memory or cache line(s).

Because the geometry at the BVH leaf level is spatially coherent, it is very likely that all primitives which are referenced by a QBVH8NodeLeaf node share common properties/features such as objectID, one or more vertices, etc. Consequently, one embodiment of the invention further reduces storage by removing primitive data duplication. For example, a primitive and associated data may be stored only once per QBVH8NodeLeaf node, thereby reducing memory consumption for leaf data further.

Quantized Oriented Bounding Boxes (OBB) at the BVH Leaf Level

The effective bounding of hair primitives is described below as one example of significant memory reductions realized by exploiting common geometry properties at the BVH leaf level. To accurately bound a hair primitive, which is a long but thin structure oriented in space, a well-known approach is to calculate an oriented bounding box to tightly bound the geometry. First a coordinate space is calculated which is aligned to the hair direction. For example, the z-axis may be determined to point into the hair direction, while the x and y axes are perpendicular to the z-axis. Using this oriented space a standard AABB can now be used to tightly bound the hair primitive. Intersecting a ray with such an oriented bound requires first transforming the ray into the oriented space and then performing a standard ray/box intersection test.

A problem with this approach is its memory usage. The transformation into the oriented space requires 9 floating point values, while storing the bounding box requires an additional 6 floating point values, yielding 60 bytes in total.

In one embodiment of the invention, the BVH compressor 2625 compresses this oriented space and bounding box for multiple hair primitives that are spatially close together. These compressed bounds can then be stored inside the compressed leaf level to tightly bound the hair primitives stored inside the leaf. The following approach is used in one embodiment to compress the oriented bounds. The oriented space can be expressed by the normalized vectors $v_x$, $v_y$, and $v_z$ that are orthogonal to each other. Transforming a point p into that space works by projecting it onto these axes:

$$p_x = \text{dot}(v_x, p)$$

$$p_y = \text{dot}(v_y, p)$$

$$p_z = \text{dot}(v_z, p)$$

As the vectors $v_x$, $v_y$, and $v_z$ are normalized, their components are in the range [−1,1]. These vectors are thus quantized using 8-bit signed fixed point numbers rather than using 8-bit signed integers and a constant scale. This way quantized $v_x'$, $v_y'$, and $v_z'$ are generated. This approach reduces the memory required to encode the oriented space from 36 bytes (9 floating point values) to only 9 bytes (9 fixed point numbers with 1 byte each).

In one embodiment, memory consumption of the oriented space is reduced further by taking advantage of the fact that all vectors are orthogonal to each other. Thus one only has to store two vectors (e.g., $p_y'$ and $p_z'$) and can calculate $p_x' = \text{cross}(p_y', p_z')$, further reducing the required storage to only six bytes.

What remains is quantizing the AABB inside the quantized oriented space. A problem here is that projecting a point p onto a compressed coordinate axis of that space (e.g., by calculating $\text{dot}(v_x', p)$) yields values of a potentially large range (as values p are typically encoded as floating point numbers). For that reason one would need to use floating point numbers to encode the bounds, reducing potential savings.

To solve this problem, one embodiment of the invention first transforms the multiple hair primitive into a space, where its coordinates are in the range $[0, 1\sqrt{3}]$. This may be done by determining the world space axis aligned bounding box b of the multiple hair primitives, and using a transformation T that first translates by b.lower to the left, and then scales by 1/max(b.size.x, b.size.y,b.size.z) in each coordinate:

$$T(p) = \frac{1}{\sqrt{3}}(p - b.\text{lower})/\max(b.\text{size}.x, b.\text{size}.y, b.\text{size}.z)$$

One embodiment ensures that the geometry after this transformation stays in the range $[0, 1\sqrt{3}]$ as then a projection of a transformed point onto a quantized vector $p_x'$, $p_y'$, or $p_z'$ stays inside the range [−1,1]. This means the AABB of the curve geometry can be quantized when transformed using T and then transformed into the quantized oriented space. In one embodiment, 8-bit signed fixed point arithmetic is used. However, for precision reasons 16-bit signed fixed point numbers may be used (e.g., encoded using 16 bit signed integers and a constant scale). This reduces the memory requirements to encode the axis-aligned bounding box from 24 bytes (6 floating point values) to only 12 bytes (6 words) plus the offset b.lower (3 floats) and scale (1 float) which are shared for multiple hair primitives.

For example, having 8 hair primitives to bound, this embodiment reduces memory consumption from 8*60 bytes=480 bytes to only 8*(6+12)+3*4+4=160 bytes, which is a reduction by 3×. Intersecting a ray with these quantized oriented bounds works by first transforming the ray using the transformation T, then projecting the ray using quantized $v_x'$, $v_y'$, and $v_z'$. Finally, the ray is intersected with the quantized AABB.

The table in FIG. 29 illustrates memory consumption (in MB) and total rendering performance (in fps) for one embodiment of the invention (CLBVH) implemented on the Intel Embree architecture, including Embree's regular BVH8 (reference) and Embree's fully-compressed QBVH8 variant; in typical two-in-two Embree BVH configurations: highest performance (SBVH+pre-gathered triangle data) and lowest memory consumption (BVH+triangle indices). Generally speaking, in its two possible configurations ("fast" and "compact") the embodiments of the invention have the same memory savings of Embree's QBVH at much lower performance impact ("fast") or achieves even better compression at roughly the same performance impact ("compact").

The table in FIG. 30 illustrates memory consumption (in MB), traversal statistics and total performance for two Embree BVH configurations: highest performance (SBVH+ pre-gathered triangle data) and lowest memory consumption (BVH+triangle indices). One embodiment of the invention (CLBVH) achieves similar or sometimes even greater memory savings as a fully compressed BVH, while reducing the runtime overhead to just a few percent.

One embodiment utilizes a modified version of the Embree 3.0 [11] CPU ray tracing framework. As a comparison framework the publicly available protoray path tracer [1] was used. For benchmarking path tracer was set to pure diffuse path tracing (up to 8 bounces) while each CPU HW thread traces a single ray. For this benchmark 15-20% time is spent in shading. The hardware platform setup is a dual-socket Xeon workstation with 2 times 28 cores and 96 GB of memory and as benchmark scenes four different models with a complexity ranging from 10M to 350M triangles were tested (using many different camera positions). The performance and memory consumption was measured for two setups: 'best performance' and 'lowest memory consumption'. These two modes required different BVH settings and primitive layouts: the first pre-gathers all triangles per BVH leaf into a compact layout and uses a BVH with spatial splits (SBVH), while the second mode just stores vertex indices per triangle and uses a regular BVH without spatial splits.

For the best performance, the table in FIG. 30 shows that the overhead of decompressing BVH nodes reduces rendering performance by 10-20%. The CLBVH approach instead results in only a 2-4% slowdown while providing similar or sometimes even slightly larger size reduction (43-45%) of the BVH nodes compared to a full compressed BVH. The size of the primitive data is unchanged. In terms of total size (BVH+leaf primitive data) these embodiments provide a similar reduction than a fully compressed BVH of 8-10%.

Reducing memory consumption of BVH nodes is more efficient in the memory setup, where the size of the primitive data is smaller (storing only vertex indices instead of full pre-gathered vertices) in relation to the size of the BVH nodes. The total reduction in memory consumption increased to 16-24% when using full compressed BVH nodes or the CLBVH approach. The CLBVH approach however, does only have 0-3.7% run-time overhead while for fully compressed BVH nodes, the overhead ranges between 7 and 14%.

For achieving maximum memory reduction a lossless leaf data compression scheme was employed (see above) to the CLBVH approach. This CLBVH* variant, has a larger run-time overhead than CLBVH but allows for reducing the leaf data (vertex indices per triangle, objectID, etc) size by 15-23%, thereby increasing the total size reduction to 26-37% compared to the uncompressed baseline.

REFERENCES

[1] Attila T. Áfra, Carsten Benthin, Ingo Wald, and Jacob Munkberg. 2016. Local Shading Coherence Extraction for SIMD-Efficient Path Tracing on CPUs. In Proceedings of High Performance Graphics (HPG '16). Eurographics Association, 119-128.
[2] Holger Dammertz, Johannes Hanika, and Alexander Keller. 2008. Shallow Bounding Volume Hierarchies for Fast SIMD Ray Tracing of Incoherent Rays. In Computer Graphics Forum (Proc. 19th Eurographics Symposium on Rendering). 1225-1234.
[3] Manfred Ernst and Gunter Greiner. 2008. Multi Bounding Volume Hierarchies. In Proceedings of the 2008 IEEE/EG Symposium on Interactive Ray Tracing. 35-40.
[4] Vlastimil Havran. 2001. Heuristic Ray Shooting Algorithms. Ph.D. Dissertation. Faculty of Electrical Engineering, Czech TU in Prague.
[5] Sean Keely. 2014. Reduced Precision for Hardware Ray Tracing in GPUs. In Proceedings of the Conference on High Performance Graphics 2014.
[6] Christian Lauterbach, Sung-Eui Yoon, Ming Tang, and Dinesh Manocha. 2008. ReduceM: Interactive and Memory Efficient Ray Tracing of Large Models. Computer Graphics Forum 27, 4 (2008), 1313-1321.
[7] Jeffrey Mahovsky and BrianWyvill. 2006. Memory-Conserving Bounding Volume Hierarchies with Coherent Raytracing. Computer Graphics Forum 25, 2 (June 2006).
[8] S. G. Parker, J. Bigler, A. Dietrich, H. Friedrich, J. Hoberock, D. Luebke, D. McAllister, M. McGuire, K. Morley, A. Robison, and others. 2010. OptiX: a general purpose ray tracing engine. ACM Transactions on Graphics (TOG) 29, 4 (2010).
[9] Benjamin Segovia and Manfred Ernst. 2010. Memory Efficient Ray Tracing with Hierarchical Mesh Quantization. In Graphics Interface 2010. 153-160.
[10] Ingo Wald, Carsten Benthin, and Solomon Boulos. 2008. Getting Rid of Packets: Efficient SIMD Single-Ray Traversal using Multi-branching BVHs. In Proc. of the IEEE/EG Symposium on Interactive Ray Tracing. 49-57.
[11] Ingo Wald, Sven Woop, Carsten Benthin, Gregory S. Johnson, and Manfred Ernst. 2014. Embree: A Kernel Framework for Efficient CPU Ray Tracing. ACM Transactions on Graphics 33, 4, Article 143 (2014), 8 pages.
[12] Henri Ylitie, Tero Karras, and Samuli Laine. 2017. Efficient Incoherent Ray Traversal on GPUs Through Compressed Wide BVHs. In Eurographics/ACM SIGGRAPH Symposium on High Performance Graphics. ACM.

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine, module, or logic may be implemented in firmware, hardware, software, or any combination of firmware, hardware, and software.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

EXAMPLES

The following are example implementations of different embodiments of the invention.

Example 1

A graphics processing apparatus comprising: one or more cores to execute graphics instructions including instructions to perform ray tracing operations with a hierarchical acceleration data structure comprising a plurality of hierarchically arranged nodes including lowest level nodes, each of the lowest level nodes comprising pointers to leaf data; and compression circuitry to compress the lowest level nodes of the hierarchical acceleration data structure, wherein to compress the lowest level nodes, the compression circuitry is configured to: quantize the lowest level nodes to generate quantized lowest level nodes, and store each quantized lowest level node and associated leaf data without the pointers to the leaf data.

Example 2

The graphics processing apparatus of example 1 wherein each quantized lowest level node is to be stored contiguously with its associated leaf data and wherein a location of each portion of the leaf data is to be determined based on its contiguously-stored relation to the associated quantized lowest level node.

Example 3

The graphics processing apparatus of example 2 further comprising: ray traversal circuitry to traverse one or more rays through the hierarchically arranged nodes; and ray intersection circuitry to determine one or more intersections of the one or more rays with one or more primitives associated with the one or more hierarchically arranged nodes.

Example 4

The graphics processing apparatus of example 3 wherein the one or more primitives are associated with the one or more hierarchically arranged nodes by being enclosed by one or more bounding boxes of the one or more hierarchically arranged nodes.

Example 5

The graphics processing apparatus of example 3 wherein the ray traversal circuitry and/or the ray intersection circuitry comprises a plurality of execution units to execute a set of instructions to traverse the one or more rays through the hierarchically arranged nodes and determine the one or more intersections.

Example 6

The graphics processing apparatus of example 1 wherein the hierarchical acceleration data structure comprises a bounding volume hierarchy (BVH) or an oriented bounding box (OBB).

Example 7

The graphics processing apparatus of example 1 wherein the compression circuitry is to determine common properties of primitives shared by at least one of the lowest level nodes and to cause data related to the common properties to be stored only once and shared by multiple primitives.

Example 8

The graphics processing apparatus of example 7 wherein the common properties comprise an objectID and/or one or more vertices of the primitives.

Example 9

The graphics processing apparatus of example 3 wherein the one or more primitives comprise hair primitives and wherein the quantized lowest level nodes comprises oriented bounding boxes (OBBs), wherein the compression circuitry is to perform the additional operations of: determining an oriented coordinate space which is aligned to a hair direction of a first hair primitive; bounding the hair primitive with an axis-aligned bounding box (AABB); and compressing the oriented coordinate space and bounding box for the first hair primitive and one or more other hair primitive that are spatially close together.

Example 10

The graphics processing apparatus of example 9 the oriented coordinate space is expressed by three vectors $v_x$, $v_y$, and $v_z$ that are orthogonal to each other and wherein transforming a point p into that space works by projecting it onto the axes: $p_x=\text{dot}(v_x, p)$, $p_y=\text{dot}(v_y, p)$, and $p_z=\text{dot}(v_z, p)$, wherein compressing the oriented coordinate space further comprises: quantizing the vectors $v_x$, $v_y$, and $v_z$ using 8-bit signed fixed point numbers to generate quantized vectors $v_x'$, $v_y'$, and $v_y'$.

Example 11

A method comprising: executing graphics instructions including instructions to perform ray tracing operations with a hierarchical acceleration data structure comprising a plurality of hierarchically arranged nodes including lowest level nodes, each of the lowest level nodes comprising pointers to leaf data; compressing the lowest level nodes by: quantizing the lowest level nodes to generate quantized lowest level nodes; and storing each quantized lowest level node and associated leaf data without the pointers to the leaf data.

Example 12

The method of example 11 wherein each quantized lowest level node is to be stored contiguously with its associated leaf data and wherein a location of each portion of the leaf data is to be determined based on its contiguously-stored relation to the associated quantized lowest level node.

Example 13

The method of example 12 further comprising: traversing one or more rays through the hierarchically arranged nodes; and determining one or more intersections of the one or more rays with one or more primitives associated with the one or more hierarchically arranged nodes.

Example 14

The method of example 13 wherein the one or more primitives are associated with the one or more hierarchically arranged nodes by being enclosed by one or more bounding boxes of the one or more hierarchically arranged nodes.

Example 15

The method of example 13 wherein the operations of traversing and determining are performed by a plurality of execution units which execute a set of instructions to traverse the one or more rays through the hierarchically arranged nodes and determine the one or more intersections.

Example 16

The method of example 11 wherein the hierarchical acceleration data structure comprises a bounding volume hierarchy (BVH) or oriented bounding boxes (OBB).

Example 17

The method of example 11 further comprising: determining common properties of primitives shared by at least one of the lowest level nodes; and causing data related to the common properties to be stored only once and shared by multiple primitives.

Example 18

The method of example 17 wherein the common properties comprise an objectID and/or one or more vertices of the primitives.

Example 19

The method of example 13 wherein the one or more primitives comprise hair primitives and wherein the quantized lowest level nodes comprises oriented bounding boxes (OBBs), wherein the compression circuitry is to perform the additional operations of: determining an oriented coordinate space which is aligned to a hair direction of a first hair primitive; bounding the hair primitive with an axis-aligned bounding box (AABB); and compressing the oriented coordinate space and bounding box for the first hair primitive and one or more other hair primitive that are spatially close together.

Example 20

The method of example 19 the oriented coordinate space is expressed by three vectors, $v_x$, $v_y$, and $v_z$, that are orthogonal to each other and wherein transforming a point p into that space works by projecting it onto the axes: $p_x=\text{dot}(v_x, p)$, $p_y=\text{dot}(v_y, p)$, and $p_z=\text{dot}(v_z, p)$, wherein compressing the oriented coordinate space further comprises: quantizing the vectors $v_x$, $v_y$, and $v_z$ using 8-bit signed fixed point numbers to generate quantized vectors $v_x'$, $v_y'$, and $v_y'$.

Example 21

A machine-readable medium having program code stored thereon which, when executed by a machine, causes the machine to perform the operations of: executing graphics instructions including instructions to perform ray tracing operations with a hierarchical acceleration data structure comprising a plurality of hierarchically arranged nodes including lowest level nodes, each of the lowest level nodes comprising pointers to leaf data; compressing the lowest level nodes by: quantizing the lowest level nodes to generate quantized lowest level nodes; and storing each quantized lowest level node and associated leaf data without the pointers to the leaf data.

Example 22

The machine-readable medium of example 21 wherein each quantized lowest level node is to be stored contiguously with its associated leaf data and wherein a location of each portion of the leaf data is to be determined based on its contiguously-stored relation to the associated quantized lowest level node.

Example 23

The machine-readable medium of example 22 further comprising: traversing one or more rays through the hierarchically arranged nodes; and determining one or more intersections of the one or more rays with one or more primitives associated with the one or more hierarchically arranged nodes.

Example 24

The machine-readable medium of example 23 wherein the one or more primitives are associated with the one or more hierarchically arranged nodes by being enclosed by one or more bounding boxes of the one or more hierarchically arranged nodes.

Example 25

The machine-readable medium of example 23 wherein the operations of traversing and determining are performed by a plurality of execution units which execute a set of instructions to traverse the one or more rays through the hierarchically arranged nodes and determine the one or more intersections.

Example 26

The machine-readable medium of example 21 wherein the hierarchical acceleration data structure comprises a bounding volume hierarchy (BVH) or oriented bounding boxes (OBB).

Example 27

The machine-readable medium of example 21 further comprising: determining common properties of primitives shared by at least one of the lowest level nodes; and causing data related to the common properties to be stored only once and shared by multiple primitives.

Example 28

The machine-readable medium of example 27 wherein the common properties comprise an objectID and/or one or more vertices of the primitives.

Example 29

The machine-readable medium of example 23 wherein the one or more primitives comprise hair primitives and wherein the quantized lowest level nodes comprises oriented bounding boxes (OBBs), wherein the compression circuitry is to perform the additional operations of: determining an oriented coordinate space which is aligned to a hair direction of a first hair primitive; bounding the hair primitive with an axis-aligned bounding box (AABB); and compressing the oriented coordinate space and bounding box for the first hair primitive and one or more other hair primitive that are spatially close together.

Example 30

The machine-readable medium of example 19 the oriented coordinate space is expressed by three vectors, $v_x$, $v_y$, and $v_z$, that are orthogonal to each other and wherein transforming a point p into that space works by projecting it onto the axes: $p_x=\text{dot}(v_x, p)$, $p_y=\text{dot}(v_y, p)$, and $p_z=\text{dot}(v_z, p)$, wherein compressing the oriented coordinate space further comprises: quantizing the vectors $v_x$, $v_y$, and $v_z$ using 8-bit signed fixed point numbers to generate quantized vectors $v_x'$, $v_y'$, and $v_y'$.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. A graphics processing apparatus comprising:
one or more cores to execute graphics instructions including instructions to perform ray tracing operations with a hierarchical acceleration data structure comprising a plurality of hierarchically arranged nodes including lowest level nodes, each of the lowest level nodes comprising pointers to leaf data; and
compression circuitry to compress the lowest level nodes of the hierarchical acceleration data structure, wherein to compress the lowest level nodes, the compression circuitry is configured to:
quantize a set of lowest level nodes of a parent inner node within the hierarchical acceleration data structure to generate a set of quantized lowest level nodes, and
store parent inner node data and the set of quantized lowest level nodes and associated leaf data without storing pointers to the associated leaf data, and wherein the pointers to the associated leaf data are to be determined using sizes of the parent inner node data and associated leaf data.

2. The graphics processing apparatus of claim 1 wherein each quantized lowest level node is to be stored contiguously with its associated leaf data and wherein a location of each portion of the leaf data is to be determined based on its contiguously-stored relation to the associated quantized lowest level node.

3. The graphics processing apparatus of claim 2 further comprising:
ray traversal circuitry to traverse one or more rays through the hierarchically arranged nodes; and
ray intersection circuitry to determine one or more intersections of the one or more rays with one or more primitives associated with the one or more hierarchically arranged nodes.

4. The graphics processing apparatus of claim 3 wherein the one or more primitives are associated with the one or more hierarchically arranged nodes by being enclosed by one or more bounding boxes of the one or more hierarchically arranged nodes.

5. The graphics processing apparatus of claim 3 wherein the ray traversal circuitry and/or the ray intersection circuitry comprises a plurality of execution units to execute a set of instructions to traverse the one or more rays through the hierarchically arranged nodes and determine the one or more intersections.

6. The graphics processing apparatus of claim 3 wherein the one or more primitives comprise hair primitives and wherein the quantized lowest level nodes comprise oriented bounding boxes (OBBs), wherein the compression circuitry is to perform the additional operations of:
determining an oriented coordinate space which is aligned to a hair direction of a first hair primitive;
bounding the hair primitive with an axis-aligned bounding box (AABB); and
compressing the oriented coordinate space and bounding box for the first hair primitive and one or more other hair primitive that are spatially close together.

7. The graphics processing apparatus of claim 6 the oriented coordinate space is expressed by three vectors $v_x$, $v_y$, and $v_z$ that are orthogonal to each other and wherein transforming a point p into that space works by projecting it onto the axes: $p_x=dot(v_x, p)$, $p_y=dot(v_y, p)$, and $p_z=dot(v_z, p)$, wherein compressing the oriented coordinate space further comprises:
quantizing the vectors $v_x$, $v_y$, and $v_z$ using 8-bit signed fixed point numbers to generate quantized vectors $v_x'$, $v_y'$, and $v_y'$.

8. The graphics processing apparatus of claim 1 wherein the hierarchical acceleration data structure comprises a bounding volume hierarchy (BVH) or an oriented bounding box (OBB).

9. The graphics processing apparatus of claim 1 wherein the compression circuitry is to determine common properties of primitives shared by at least one of the lowest level nodes and to cause data related to the common properties to be stored only once and shared by multiple primitives.

10. The graphics processing apparatus of claim 9 wherein the common properties comprise an objectID and/or one or more vertices of the primitives.

11. A method comprising:
executing graphics instructions including instructions to perform ray tracing operations with a hierarchical acceleration data structure comprising a plurality of hierarchically arranged nodes including lowest level nodes, each of the lowest level nodes comprising pointers to leaf data;

compressing the lowest level nodes by:
quantizing a set of lowest level nodes of a parent inner node within the hierarchical acceleration data structure to generate a set of quantized lowest level nodes; and
storing parent inner node data and the set of quantized lowest level node and associated leaf data without storing pointers to the associated leaf data, and wherein the pointers to the associated leaf data are to be determined using sizes of the parent inner node data and associated leaf data.

12. The method of claim 11 wherein each quantized lowest level node is to be stored contiguously with its associated leaf data and wherein a location of each portion of the leaf data is to be determined based on its contiguously-stored relation to the associated quantized lowest level node.

13. The method of claim 12 further comprising:
traversing one or more rays through the hierarchically arranged nodes; and
determining one or more intersections of the one or more rays with one or more primitives associated with the one or more hierarchically arranged nodes.

14. The method of claim 13 wherein the one or more primitives are associated with the one or more hierarchically arranged nodes by being enclosed by one or more bounding boxes of the one or more hierarchically arranged nodes.

15. The method of claim 13 wherein the operations of traversing and determining are performed by a plurality of execution units which execute a set of instructions to traverse the one or more rays through the hierarchically arranged nodes and determine the one or more intersections.

16. The method of claim 13 wherein the one or more primitives comprise hair primitives and wherein the quantized lowest level nodes comprise oriented bounding boxes (OBBs), wherein the method further comprises:
determining an oriented coordinate space which is aligned to a hair direction of a first hair primitive;
bounding the hair primitive with an axis-aligned bounding box (AABB); and
compressing the oriented coordinate space and bounding box for the first hair primitive and one or more other hair primitive that are spatially close together.

17. The method of claim 16 the oriented coordinate space is expressed by three vectors, $v_x$, $v_y$, and $v_z$, that are orthogonal to each other and wherein transforming a point p into that space works by projecting it onto the axes: $p_x=dot(v_x, p)$, $p_y=dot(v_y, p)$, and $p_z=dot(v_z, p)$, wherein compressing the oriented coordinate space further comprises:
quantizing the vectors $v_x$, $v_y$, and $v_z$ using 8-bit signed fixed point numbers to generate quantized vectors $v_x'$, $v_y'$, and $v_y'$.

18. The method of claim 11 wherein the hierarchical acceleration data structure comprises a bounding volume hierarchy (BVH) or oriented bounding boxes (OBB).

19. The method of claim 11 further comprising:
determining common properties of primitives shared by at least one of the lowest level nodes; and
causing data related to the common properties to be stored only once and shared by multiple primitives.

20. The method of claim 19 wherein the common properties comprise an objectID and/or one or more vertices of the primitives.

21. A non-transitory machine-readable medium having program code stored thereon which, when executed by a machine, causes the machine to perform the operations of:
executing graphics instructions including instructions to perform ray tracing operations with a hierarchical acceleration data structure comprising a plurality of hierarchically arranged nodes including lowest level nodes, each of the lowest level nodes comprising pointers to leaf data;
compressing the lowest level nodes by:
quantizing a set of lowest level nodes of a parent inner node within the hierarchical acceleration data structure to generate a set of quantized lowest level nodes; and
storing parent inner node data and the set of quantized lowest level node and associated leaf data without storing pointers to the associated leaf data, and wherein the pointers to the associated leaf data are to be determined using sizes of the parent inner node data and associated leaf data.

22. The non-transitory machine-readable medium of claim 21 wherein each quantized lowest level node is to be stored contiguously with its associated leaf data and wherein a location of each portion of the leaf data is to be determined based on its contiguously-stored relation to the associated quantized lowest level node.

23. The non-transitory machine-readable medium of claim 22 further comprising:
traversing one or more rays through the hierarchically arranged nodes; and
determining one or more intersections of the one or more rays with one or more primitives associated with the one or more hierarchically arranged nodes.

24. The non-transitory machine-readable medium of claim 23 wherein the one or more primitives are associated with the one or more hierarchically arranged nodes by being enclosed by one or more bounding boxes of the one or more hierarchically arranged nodes.

25. The non-transitory machine-readable medium of claim 23 wherein the operations of traversing and determining are performed by a plurality of execution units which execute a set of instructions to traverse the one or more rays through the hierarchically arranged nodes and determine the one or more intersections.

26. The non-transitory machine-readable medium of claim 23 wherein the one or more primitives comprise hair primitives and wherein the quantized lowest level nodes comprise oriented bounding boxes (OBBs), wherein the operations further comprise:
determining an oriented coordinate space which is aligned to a hair direction of a first hair primitive;
bounding the hair primitive with an axis-aligned bounding box (AABB); and
compressing the oriented coordinate space and bounding box for the first hair primitive and one or more other hair primitive that are spatially close together.

27. The non-transitory machine-readable medium of claim 26 the oriented coordinate space is expressed by three vectors, $v_x$, $v_y$, and $v_z$, that are orthogonal to each other and wherein transforming a point p into that space works by projecting it onto the axes: $p_x=dot(v_x, p)$, $p_y=dot(v_y, p)$, and $p_z=dot(v_z, p)$, wherein compressing the oriented coordinate space further comprises:
quantizing the vectors $v_x$, $v_y$, and $v_z$ using 8-bit signed fixed point numbers to generate quantized vectors $v_x'$, $v_y'$, and $v_y'$.

28. The non-transitory machine-readable medium of claim 21 wherein the hierarchical acceleration data structure comprises a bounding volume hierarchy (BVH) or oriented bounding boxes (OBB).

29. The non-transitory machine-readable medium of claim 21 further comprising:
   determining common properties of primitives shared by at least one of the lowest level nodes; and
   causing data related to the common properties to be stored only once and shared by multiple primitives.

30. The non-transitory machine-readable medium of claim 29 wherein the common properties comprise an objectID and/or one or more vertices of the primitives.

* * * * *